United States Patent
Kiriyama et al.

(10) Patent No.: US 11,979,344 B2
(45) Date of Patent: May 7, 2024

(54) COMMUNICATION DEVICE AND METHOD

(71) Applicant: SONY GROUP CORPORATION, Tokyo (JP)

(72) Inventors: Sawako Kiriyama, Tokyo (JP); Masanori Sato, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 11 days.

(21) Appl. No.: 17/614,056

(22) PCT Filed: May 25, 2020

(86) PCT No.: PCT/JP2020/020578
§ 371 (c)(1),
(2) Date: Nov. 24, 2021

(87) PCT Pub. No.: WO2020/246290
PCT Pub. Date: Dec. 10, 2020

(65) Prior Publication Data
US 2022/0231803 A1    Jul. 21, 2022

(30) Foreign Application Priority Data

Jun. 5, 2019   (JP) .................. 2019-105017

(51) Int. Cl.
*H04L 5/00* (2006.01)
*H04L 1/1867* (2023.01)
(52) U.S. Cl.
CPC .......... *H04L 5/0016* (2013.01); *H04L 5/0051* (2013.01); *H04L 1/189* (2013.01)

(58) Field of Classification Search
CPC ... H04L 5/0001; H04L 5/0014; H04L 5/0016; H04L 5/0044; H04L 5/0051; H04L 1/18;
(Continued)

(56) References Cited

U.S. PATENT DOCUMENTS

| 9,692,581 | B1* | 6/2017 | Kim ................. H04L 5/0073 |
| 2003/0053440 | A1* | 3/2003 | Gruhn .............. H04W 28/06 370/349 |

(Continued)

FOREIGN PATENT DOCUMENTS

| CN | 110431910 A | 11/2019 |
| CN | 110720192 A | 1/2020 |

(Continued)

OTHER PUBLICATIONS

International Search Report and Written Opinion of PCT Application No. PCT/JP2020/020578, dated Aug. 25, 2020, 10 pages of ISRWO.

(Continued)

*Primary Examiner* — Warner Wong
(74) *Attorney, Agent, or Firm* — CHIP LAW GROUP

(57) ABSTRACT

Provided is a communication device that determines a first wireless resource including a frequency for transmission of a same frame that is a frame of same data, a code of the same frame, and a time for transmission of the same frame on the basis of pattern information indicating a unique relationship between a frame number of the same frame and at least one of the frequency or the code. Further, the communication device repeatedly transmits the same frame by using the first wireless resource.

12 Claims, 35 Drawing Sheets

| Pattern No. | Frame No. | | | |
|---|---|---|---|---|
| | 1 | 2 | 3 | 4 |
| 1 | $f_8$ | $f_5$ | $f_7$ | $f_0$ |
| 2 | $f_7$ | $f_8$ | $f_0$ | $f_5$ |
| 3 | $f_6$ | $f_3$ | $f_8$ | $f_2$ |
| 4 | $f_5$ | $f_4$ | $f_6$ | $f_8$ |
| 5 | $f_4$ | $f_1$ | $f_2$ | $f_7$ |
| 6 | $f_3$ | $f_0$ | $f_5$ | $f_1$ |
| 7 | $f_2$ | $f_6$ | $f_1$ | $f_3$ |
| 8 | $f_1$ | $f_7$ | $f_4$ | $f_6$ |
| 9 | $f_0$ | $f_2$ | $f_3$ | $f_4$ |

(58) Field of Classification Search
CPC ... H04L 1/1812; H04L 1/1816; H04L 1/1829; H04L 1/1867; H04L 1/189; H04L 69/22; H04L 27/00; H04L 27/20; H04L 27/22; H04W 24/00

See application file for complete search history.

(56) References Cited

U.S. PATENT DOCUMENTS

| | | | |
|---|---|---|---|
| 2008/0267126 A1* | 10/2008 | Vujcic | H04W 74/0866 370/330 |
| 2010/0074357 A1* | 3/2010 | Ko | H04B 7/0671 375/267 |
| 2011/0096795 A1* | 4/2011 | Liva | H04L 1/0084 370/474 |
| 2016/0241351 A1* | 8/2016 | Suzuki | H04L 27/2691 |
| 2017/0244529 A1* | 8/2017 | Yu | H04W 72/23 |
| 2018/0076915 A1* | 3/2018 | Carrick | H04L 1/0009 |
| 2018/0199359 A1* | 7/2018 | Cao | H04L 1/1896 |
| 2018/0359715 A1 | 12/2018 | Abedini et al. | |
| 2019/0268196 A1* | 8/2019 | Chen | H04W 56/001 |
| 2019/0334651 A1* | 10/2019 | Ji | H04L 5/005 |
| 2020/0137769 A1* | 4/2020 | Sun | H04L 5/0037 |
| 2021/0282118 A1* | 9/2021 | Zuo | H04L 1/1893 |

FOREIGN PATENT DOCUMENTS

| | | |
|---|---|---|
| EP | 3051760 A1 | 8/2016 |
| JP | 2018520551 A | 7/2018 |
| JP | 2020-507248 A | 3/2020 |
| JP | 2020-523821 A | 8/2020 |
| KR | 10-2019-0103359 A | 9/2019 |
| KR | 10-2020-0013036 A | 2/2020 |
| WO | 2015/045585 A1 | 4/2015 |
| WO | 2017/212810 A1 | 12/2017 |
| WO | 2018/127201 A1 | 7/2018 |
| WO | 2018/226308 A1 | 12/2018 |

OTHER PUBLICATIONS

Seo, et al., "A novel frame level orthogonal code hopping multiplexing scheme", IEEE, International Conference on Communications, vol. 4, May 16-20, 2005, pp. 2218-2222.

* cited by examiner

FIG. 3

| Pattern No. | Frame No. | | | |
|---|---|---|---|---|
| | 1 | 2 | 3 | 4 |
| 1 | $f_8$ | $f_5$ | $f_7$ | $f_0$ |
| 2 | $f_7$ | $f_8$ | $f_0$ | $f_5$ |
| 3 | $f_6$ | $f_3$ | $f_8$ | $f_2$ |
| 4 | $f_5$ | $f_4$ | $f_6$ | $f_8$ |
| 5 | $f_4$ | $f_1$ | $f_2$ | $f_7$ |
| 6 | $f_3$ | $f_0$ | $f_5$ | $f_1$ |
| 7 | $f_2$ | $f_6$ | $f_1$ | $f_3$ |
| 8 | $f_1$ | $f_7$ | $f_4$ | $f_6$ |
| 9 | $f_0$ | $f_2$ | $f_3$ | $f_4$ |

*FIG. 12*

Time

| Pattern No. | Frame No. | | | |
|---|---|---|---|---|
| | 1 | 2 | 3 | 4 |
| 1 | 0 | $T_1$ | $T_1$ | $T_1$ |

*FIG. 13*

Freq

| Pattern No. | Frame No. | | | |
|---|---|---|---|---|
| | 1 | 2 | 3 | 4 |
| 1 | $f_8$ | $f_5$ | $f_7$ | $f_0$ |
| 2 | $f_7$ | $f_8$ | $f_0$ | $f_5$ |
| 3 | $f_6$ | $f_3$ | $f_8$ | $f_2$ |
| 4 | $f_5$ | $f_4$ | $f_6$ | $f_8$ |
| 5 | $f_4$ | $f_1$ | $f_2$ | $f_7$ |
| 6 | $f_3$ | $f_0$ | $f_5$ | $f_1$ |
| 7 | $f_2$ | $f_6$ | $f_1$ | $f_3$ |
| 8 | $f_1$ | $f_7$ | $f_4$ | $f_6$ |
| 9 | $f_0$ | $f_2$ | $f_3$ | $f_4$ |

FIG. 14

Code

| Pattern No. | Frame No. | | | |
|---|---|---|---|---|
| | 1 | 2 | 3 | 4 |
| 1 | $C_1$ | $C_2$ | $C_3$ | $C_4$ |

| Code | Value1 | Value2 | Value3 | Value4 |
|---|---|---|---|---|
| $C_1$ | $V_1$ | $V_2$ | $V_3$ | $V_4$ |
| $C_2$ | $V_2$ | $V_3$ | $V_4$ | $V_1$ |
| $C_3$ | $V_3$ | $V_4$ | $V_1$ | $V_2$ |
| $C_4$ | $V_4$ | $V_1$ | $V_2$ | $V_3$ |

FIG. 16

| No. | TimE | Freq. | Code |
|---|---|---|---|
| 1 | $T'+T_1$ | $f_5$ | $C_2$ |
| 2 | $T'+2T_1$ | $f_2$ | $C_1$ |
| 3 | $T'+2T_1$ | $f_7$ | $C_3$ |
| 4 | $T'+3T_1$ | $f_0$ | $C_4$ |
| 5 | $T'+3T_1$ | $f_6$ | $C_2$ |
| 6 | $T'+4T_1$ | $f_1$ | $C_3$ |
| 7 | $T'+5T_1$ | $f_3$ | $C_4$ |

FIG. 28

Time

| Pattern No. | Frame No. | | | |
|---|---|---|---|---|
| | 1 | 2 | 3 | 4 |
| 1 | 0 | $T_1$ | $T_1$ | $T_1$ |

FIG. 29

Freq

| Pattern No. | Frame No. | | | |
|---|---|---|---|---|
| | 1 | 2 | 3 | 4 |
| 1 | $f_8$ | $f_5$ | $f_7$ | $f_0$ |
| 2 | $f_2$ | $f_6$ | $f_1$ | $f_3$ |

FIG. 30

Code

| Pattern No. | Frame No. | | | |
|---|---|---|---|---|
| | 1 | 2 | 3 | 4 |
| 1 | $C_1$ | $C_1$ | $C_1$ | $C_1$ |

| Code | Value1 | Value2 | Value3 | Value4 |
|---|---|---|---|---|
| $C_1$ | $V_1$ | $V_2$ | $V_3$ | $V_4$ |

FIG. 31

| No. | Time | Freq. | Code |
|---|---|---|---|
| 1 | $T'+T_1$ | $f_5$ | $C_1$ |
| 2 | $T'+2T_1$ | $f_2$ | $C_1$ |
| 3 | $T'+2T_1$ | $f_7$ | $C_1$ |
| 4 | $T'+3T_1$ | $f_0$ | $C_1$ |
| 5 | $T'+3T_1$ | $f_6$ | $C_1$ |
| 6 | $T'+4T_1$ | $f_1$ | $C_1$ |
| 7 | $T'+5T_1$ | $f_3$ | $C_1$ |

FIG. 34

| Pattern No. | Frame No. | | | |
|---|---|---|---|---|
| | 1 | 2 | 3 | 4 |
| 1 | 0 | $T_1$ | $T_1$ | $T_1$ |

Time

FIG. 35

| Pattern No. | Frame No. | | | |
|---|---|---|---|---|
| | 1 | 2 | 3 | 4 |
| 1 | $f_8$ | $f_5$ | $f_7$ | $f_0$ |
| 2 | $f_2$ | $f_6$ | $f_1$ | $f_3$ |
| 3 | $f_5$ | $f_2$ | $f_3$ | $f_7$ |
| 4 | $f_6$ | $f_8$ | $f_0$ | $f_1$ |

Freq

FIG. 36

Code

| Pattern No. | Frame No. | | | |
|---|---|---|---|---|
| | 1 | 2 | 3 | 4 |
| 1 | $C_1$ | $C_2$ | $C_1$ | $C_2$ |

| Code | Value1 | Value2 | Value3 | Value4 |
|---|---|---|---|---|
| $C_1$ | $V_1$ | $V_2$ | $V_3$ | $V_4$ |
| $C_2$ | $V_2$ | $V_3$ | $V_4$ | $V_1$ |

FIG. 37

| No. | Time | Freq. | Code |
|---|---|---|---|
| 1 | $T'+T_1$ | $f_5$ | $C_2$ |
| 2 | $T'+2T_1$ | $f_2$ | $C_1$ |
| 3 | $T'+2T_1$ | $f_7$ | $C_1$ |
| 4 | $T'+3T_1$ | $f_0$ | $C_2$ |
| 5 | $T'+3T_1$ | $f_6$ | $C_2$ |
| 6 | $T'+4T_1$ | $f_1$ | $C_1$ |
| 7 | $T'+5T_1$ | $f_3$ | $C_2$ |

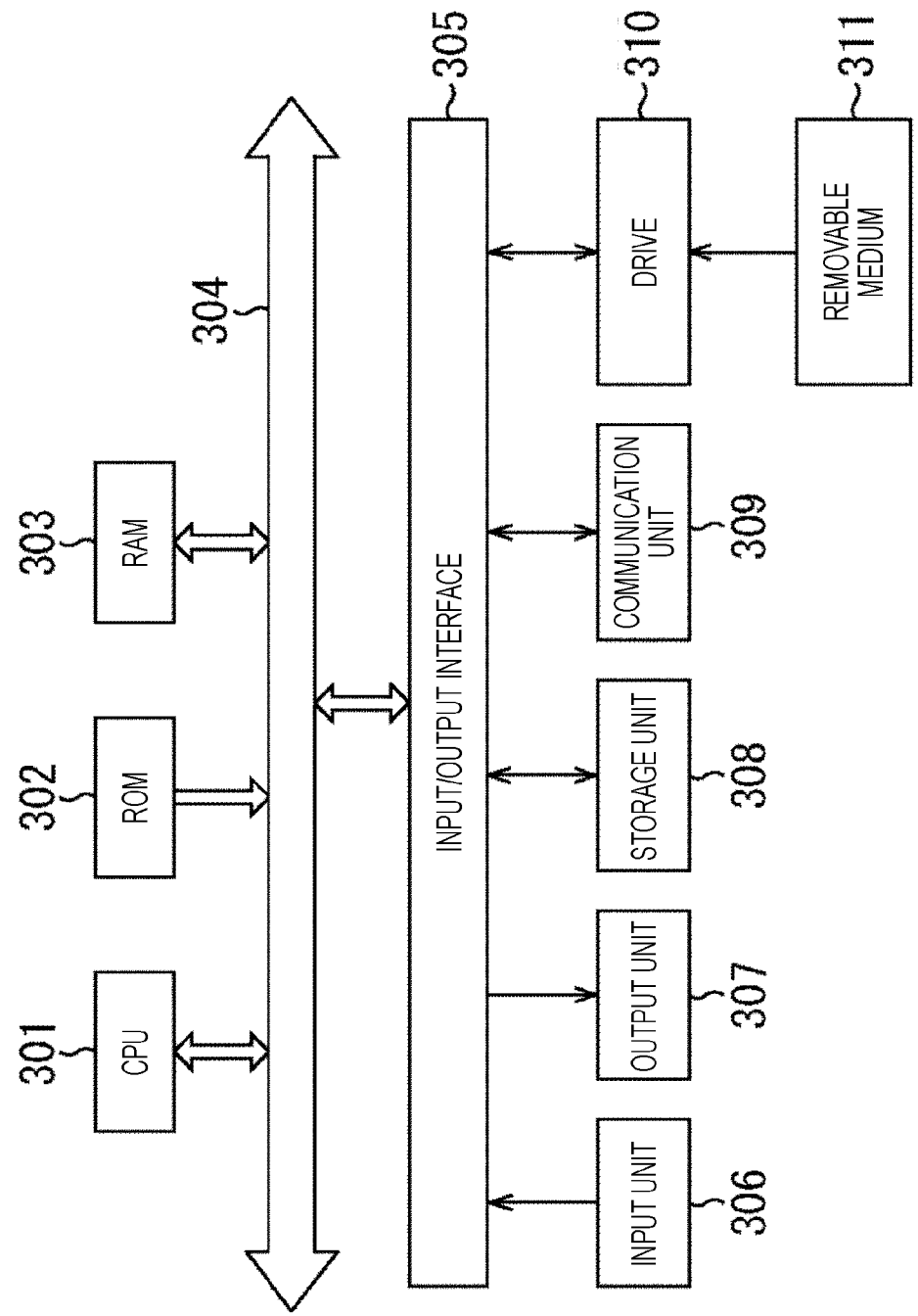

COMMUNICATION DEVICE AND METHOD

CROSS REFERENCE TO RELATED APPLICATIONS

This application is a U.S. National Phase of International Patent Application No. PCT/JP2020/020578 filed on May 25, 2020, which claims priority benefit of Japanese Patent Application No. JP 2019-105017 filed in the Japan Patent Office on Jun. 5, 2019. Each of the above-referenced applications is hereby incorporated herein by reference in its entirety.

TECHNICAL FIELD

The present technology relates to a communication device and method, and more particularly to a communication device and method capable of correctly specifying a same frame.

BACKGROUND ART

There is a wireless communication system for Internet of Things (IoT) in which a sensor terminal is assigned to a person or an object and information acquired from the sensor terminal is periodically transmitted by wireless communication. Using the wireless communication system for IoT makes it possible to create a new service. For example, a watching service can be realized by mounting a sensor terminal with GPS on an elderly person or a child and periodically transmitting location information as sensor data. In such a wireless communication system for IoT, long-distance transmission and low power consumption are required.

As a method of realizing long-distance transmission, a method of synthesizing a reception signal is considered. By a transmission terminal repeatedly transmitting a same frame and a reception terminal synthesizing a reception signal, an S/N can be increased. As a result, long-distance transmission can be performed.

In order for the transmission terminal to repeatedly transmit the same frame and the reception terminal to synthesize the reception signal, the reception terminal needs to specify the same frame.

As a method of specifying the same frame, a method of selecting and transmitting a wireless resource on the basis of a hopping pattern is generally used.

For example, in a technique described in Patent Document 1, the same frame can be specified by uniquely determining a wireless resource of a repeatedly transmitted frame on the basis of time synchronization and a notification of information on a wireless resource of a head frame, and on the basis of a known hopping pattern.

However, beacon reception for time synchronization and transmission and reception of control signaling for providing notification of information on the wireless resource of the head frame consume power of the transmission terminal, which is undesirable.

Therefore, a wireless communication system that performs repetitive transmission and synthesis asynchronously and without control signaling is considered. First, the transmission terminal selects a hopping pattern and starts repetitive transmission.

A device of a base station detects a frame by using all usable codes for all usable frequencies, and specifies a same frame on the basis of the detected frame. By regarding a frame at the earliest detection time as a head frame and performing pattern matching on the detected frame by using the hopping pattern, the same frame is specified.

CITATION LIST

Patent Document

Patent Document 1: International Publication No. 2017/212810

SUMMARY OF THE INVENTION

Problems to be Solved by the Invention

However, the device of the base station cannot always detect the head frame of the repetitive transmission, due to an influence of interference or the like. In this case, it has been difficult to correctly specify the same frame.

The present technology has been made in view of such a situation, and is intended to enable correct specification of a same frame.

Solutions to Problems

A communication device of one aspect of the present technology includes: a wireless resource determination unit configured to determine a first wireless resource including a frequency for transmission of a same frame that is a frame of same data, a code of the same frame, and a time for transmission of the same frame, on the basis of pattern information indicating a unique relationship between a frame number of the same frame and at least one of the frequency or the code; and a transmission unit configured to repeatedly transmit the same frame by using the first wireless resource.

A communication device of another aspect of the present technology includes: a frame detection unit configured to detect a data frame being transmitted with use of a wireless resource including a frequency for transmission of the data frame, a code of the data frame, and a time for transmission of the data frame; a frame specification unit configured to specify, from the detected data frame on the basis of pattern information, a same frame being transmitted with use of a first wireless resource determined on the basis of the pattern information indicating a unique relationship between a frame number of the same frame that is a frame of same data and at least one of the frequency or the code; and a demodulation unit configured to synthesize and demodulate the same frame.

In one aspect of the present technology, a first wireless resource including a frequency for transmission of a same frame that is a frame of same data, a code of the same frame, and a time for transmission of the same frame is determined on the basis of pattern information indicating a unique relationship between a frame number of the same frame and at least one of the frequency or the code. Then, the same frame is repeatedly transmitted by using the first wireless resource.

In another aspect of the present technology, a data frame is detected that is being transmitted with use of a wireless resource including a frequency for transmission of the data frame, a code of the data frame, and a time for transmission of the data frame. Then, from the detected data frame on the basis of pattern information, the same frame is specified that is being transmitted with use of the first wireless resource determined on the basis of the pattern information indicating a unique relationship between a frame number of the same frame that is a frame of same data, and at least one of the frequency or the code, and the same frame is synthesized and demodulated.

BRIEF DESCRIPTION OF DRAWINGS

FIG. 3 is a table illustrating an example of a frequency hopping pattern.

FIG. 12 is a table illustrating an example of a time hopping pattern.

FIG. 13 is a table illustrating an example of a frequency hopping pattern.

FIG. 14 is a table illustrating an example of a code hopping pattern.

FIG. 16 is a table illustrating a detection frame list in the communication device.

FIG. 28 is a table illustrating an example of a time hopping pattern.

FIG. 29 is a table illustrating an example of a frequency hopping pattern.

FIG. 30 is a table illustrating an example of a code hopping pattern.

FIG. 31 is a table illustrating a detection frame list in the communication device.

FIG. 34 is a table illustrating an example of a time hopping pattern.

FIG. 35 is a table illustrating an example of a frequency hopping pattern.

FIG. 36 is a table illustrating an example of a code hopping pattern.

FIG. 37 is a table illustrating a detection frame list in the communication device.

FIG. 40 is a block diagram illustrating a configuration example of a computer.

MODE FOR CARRYING OUT THE INVENTION

Hereinafter, an embodiment for implementing the present technology will be described. The description will be given in the following order.

1. First embodiment (example with control signaling)
2. Second embodiment (example without control signaling)
3. Third embodiment (example of specifying frame number on basis of code)
4. Fourth embodiment (example of specifying frame number on basis of frequency)
5. Fifth embodiment (example of specifying frame number on basis of combination of frequency and code)
6. Other 1. First Embodiment (Example with Control Signaling)

<Configuration Example of Wireless Communication System>

Figure 1:
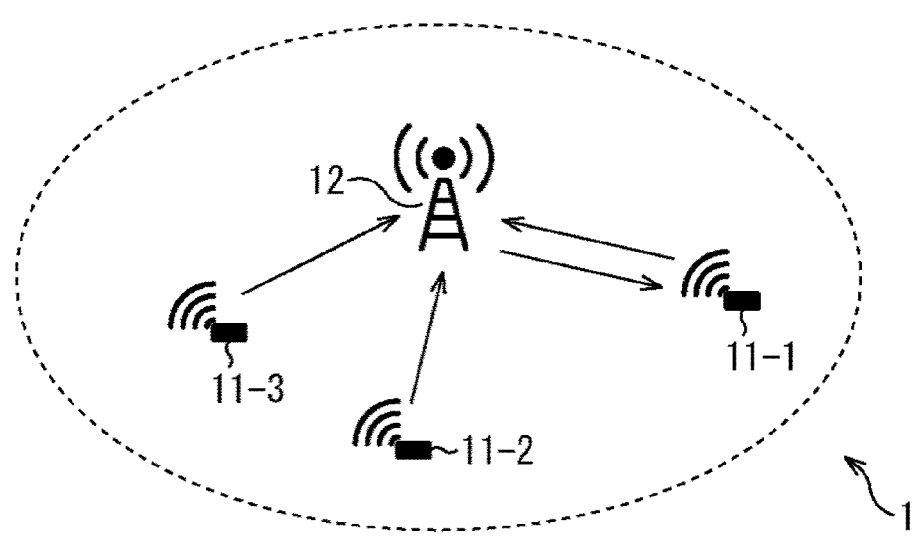
FIG. 1 is a diagram illustrating a configuration example of a wireless communication system of the present technology.

FIG. 1 is a view illustrating a configuration example of a wireless communication system according to a first embodiment of the present technology.

A wireless communication system 1 of FIG. 1 is configured by connecting user terminals 11-1 to 11-3 and a communication device 12 by wireless communication.

The wireless communication between the user terminals 11-1 to 11-3 and the communication device 12 is two-way communication including UL (UP LINK) communication from the user terminals 11-1 to 11-3 to the communication device 12 and DL (DOWN LINK) communication from the communication device 12 to the user terminals 11-1 to 11-3.

The user terminals 11-1 to 11-N are Internet of things (IoT) devices including one or more sensors.

Hereinafter, in a case where it is not necessary to individually distinguish the user terminals 11-1 to 11-3, they are collectively referred to as a user terminal 11, as appropriate.

For example, as the UL communication, the user terminal 11 measures a measurement target and transmits a data frame containing sensor data representing a measurement result, to the communication device 12.

In a case of FIG. 1, the user terminal 11 and the communication device 12 are time-synchronized in advance. The user terminal 11 selects a wireless resource by using a hopping pattern. The user terminal 11 repeatedly transmits a same frame, which is a same data frame, for example, four times by using the selected wireless resource.

The hopping pattern is shared as pattern information between the user terminal 11 and the communication device 12. The hopping pattern includes one or a plurality of patterns indicating a combination of a wireless resource and a frame number. The wireless resource includes a frequency, a time, and a code. The frequency is a frequency at which a frame is transmitted. The time is a transmission time interval (transmission interval) at which a frame is transmitted. The code is information regarding a code of a frame, and is an initial value to be used for generating a code in a case of the present technology.

The user terminal 11 transmits a control frame including control signaling to the communication device 12 prior to transmission of the data frame. The control frame includes information on a wireless resource of a head frame.

Furthermore, the user terminal 11 determines a wireless resource of the DL communication on the basis of the wireless resource used in the UL communication. The user terminal 11 receives the data frame being transmitted from the communication device 12, as the DL communication.

The communication device 12 constitutes a base station. The communication device 12 performs frame detection after receiving the control frame being transmitted from the user terminal 11. The communication device 12 specifies a same frame from the detected frames by using information on the wireless resource of the head frame obtained by receiving the control frame and using the known hopping pattern. The communication device 12 synthesizes the specified same frame and performs demodulation.

Furthermore, the communication device 12 determines the wireless resource of the DL communication on the basis of the wireless resource used in the UL communication, and transmits the data frame to the user terminal 11, as the DL communication.

<Configuration Example of Communication Device>

Figure 2:
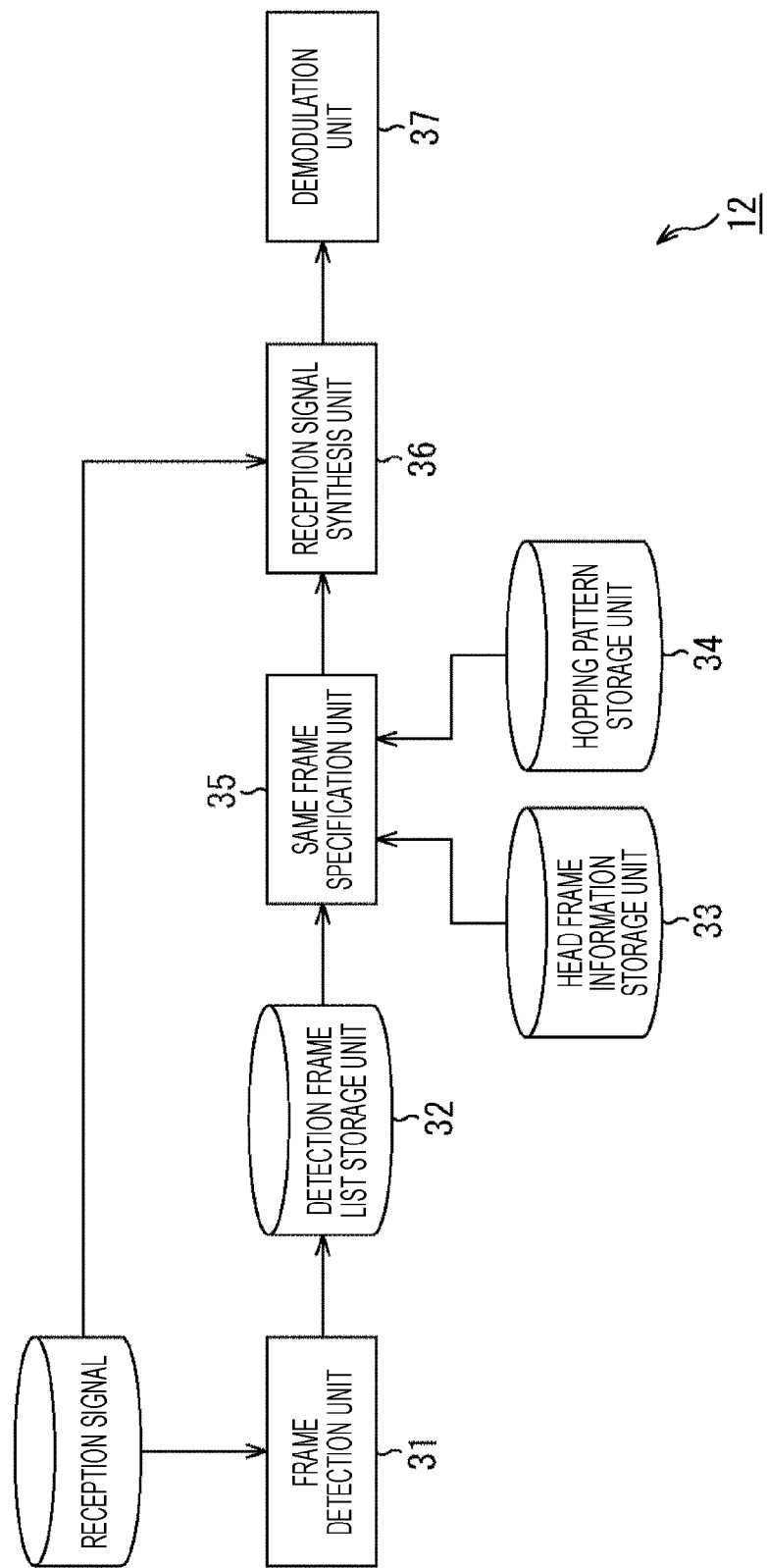
FIG. 2 is a block diagram illustrating a configuration example of a communication device.

FIG. 2 is a block diagram illustrating a configuration example of the communication device 12.

The communication device 12 includes a frame detection unit 31, a detection frame list storage unit 32, a head frame information storage unit 33, a hopping pattern storage unit 34, a same frame specification unit 35, a reception signal synthesis unit 36, and a demodulation unit 37.

A reception signal is supplied to the frame detection unit 31 and the reception signal synthesis unit 36.

The frame detection unit 31 calculates a correlation between a reception signal and a known pattern, and determines that a frame is detected in a case where the calculated correlation value exceeds a predetermined threshold value. The frame detection unit 31 adds information on a wireless resource (a frequency, a time, and a code) of the detected frame to the detection frame list storage unit 32. The detection frame list storage unit 32 stores information on the wireless resource of the detected frame.

The head frame information storage unit 33 is notified of and stores information on the wireless resource of the head frame by control signaling before transmission of the data frame. The hopping pattern storage unit 34 stores a hopping pattern.

The same frame specification unit 35 specifies a repeatedly transmitted same frame from the detected frames. The same frame specification unit 35 uniquely determines a wireless resource to be used in the repeatedly transmitted same frame, on the basis of the information on the wireless resource of the head frame and on the basis of the hopping pattern, to specify the same frame.

The reception signal synthesis unit 36 segments a reception signal of the wireless resource specified by the same frame specification unit 35 as the same frame from the received reception signal, and synthesizes the reception signal. The demodulation unit 37 demodulates the signal synthesized by the reception signal synthesis unit 36.

As described above, in the communication device 12 of FIG. 2, on the basis of time synchronization, acquisition of information on the wireless resource of the head frame, and the known hopping pattern, the wireless resource to be used for the repeatedly transmitted same frame is uniquely determined. As a result, the same frame can be specified.

However, beacon transmission for time synchronization and transmission and reception of control signaling for providing notification of information on the wireless resource of the head frame consume power of the user terminal 11, which is undesirable.

2. Second Embodiment (Example without Control Signaling)

Therefore, as a second embodiment of the present technology, a system that performs repetitive transmission and synthesis asynchronously and without control signaling will be described. Note that the description will be made with reference to the wireless communication system 1 of FIG. 1 again.

A user terminal 11 selects any pattern from a hopping pattern shared in advance as pattern information in the wireless communication system 1, and repeatedly transmits a same frame at any time.

<Example of Hopping Pattern>

FIG. 3 is a table illustrating an example of a frequency hopping pattern.

The frequency hopping pattern defines a frequency to be used for each frame to be repeatedly transmitted. FIG. 3 illustrates a hopping pattern including a plurality of patterns in which the number of times of repetitive transmission is four and the number of usable frequencies is nine.

In a case where a pattern of pattern number 1 is selected, frequencies $f_8$, $f_5$, $f_7$, and $f_0$ are used to transmit frames of frame numbers 1 to 4, respectively. In a case where the pattern of pattern number 2 is selected, frequencies $f_7$, $f_8$, $f_0$, and $f_5$ are used to transmit the frames of frame numbers 1 to 4, respectively. In a case where the pattern of pattern number 3 is selected, frequencies $f_6$, $f_3$, $f_0$, and $f_2$ are used to transmit the frames of frame numbers 1 to 4, respectively. In a case where the pattern of pattern number 4 is selected, frequencies $f_5$, $f_4$, $f_6$, and $f_8$ are used to transmit the frames of frame numbers 1 to 4, respectively.

In a case where the pattern of pattern number 5 is selected, frequencies $f_4$, $f_1$, $f_2$, and $f_7$ are used to transmit the frames of frame numbers 1 to 4, respectively. In a case where the pattern of pattern number 6 is selected, frequencies $f_3$, $f_0$, $f_5$, and $f_1$ are used to transmit the frames of frame numbers 1 to 4, respectively. In a case where the pattern of pattern number 7 is selected, frequencies $f_2$, $f_6$, $f_1$, and $f_3$ are used to transmit the frames of frame numbers 1 to 4, respectively.

In a case where the pattern of pattern number 8 is selected, frequencies $f_1$, $f_7$, $f_4$, and $f_6$ are used to transmit the frames of frame numbers 1 to 4, respectively. In a case where the pattern of pattern number 9 is selected, frequencies $f_0$, $f_2$, $f_3$, and $f_4$ are used to transmit the frames of frame numbers 1 to 4, respectively.

As described above, the combination of the frame number and the frequency is different for each pattern.

For example, in a case where the user terminal 11 selects the pattern of pattern number 1, a same frame is transmitted by using frequencies $f_8$, $f_5$, $f_7$, and $f_0$. Here, for convenience of description, a time and a code that are the wireless resource other than the frequency are fixed. However, the hopping pattern may be defined and made variable also for the time and the code. Furthermore, as described above, the time here refers to a transmission interval at which the same frame is transmitted. The code represents an initial value to be used for generating a preamble/SYNC and a scramble pattern (code).

Furthermore, in the wireless communication system 1, by using this hopping pattern, the wireless resource to be used for the DL communication is determined on the basis of the wireless resource used for the UL communication. For example, the DL communication is started after Δt from a transmission start time of a head frame to be repeatedly transmitted. For the DL communication, there is used a wireless resource indicated by a pattern of a pattern number obtained by adding ΔP to pattern number 1 used for the UL communication.

<Wireless Resource to be Used by User Terminal>

Figure 4:
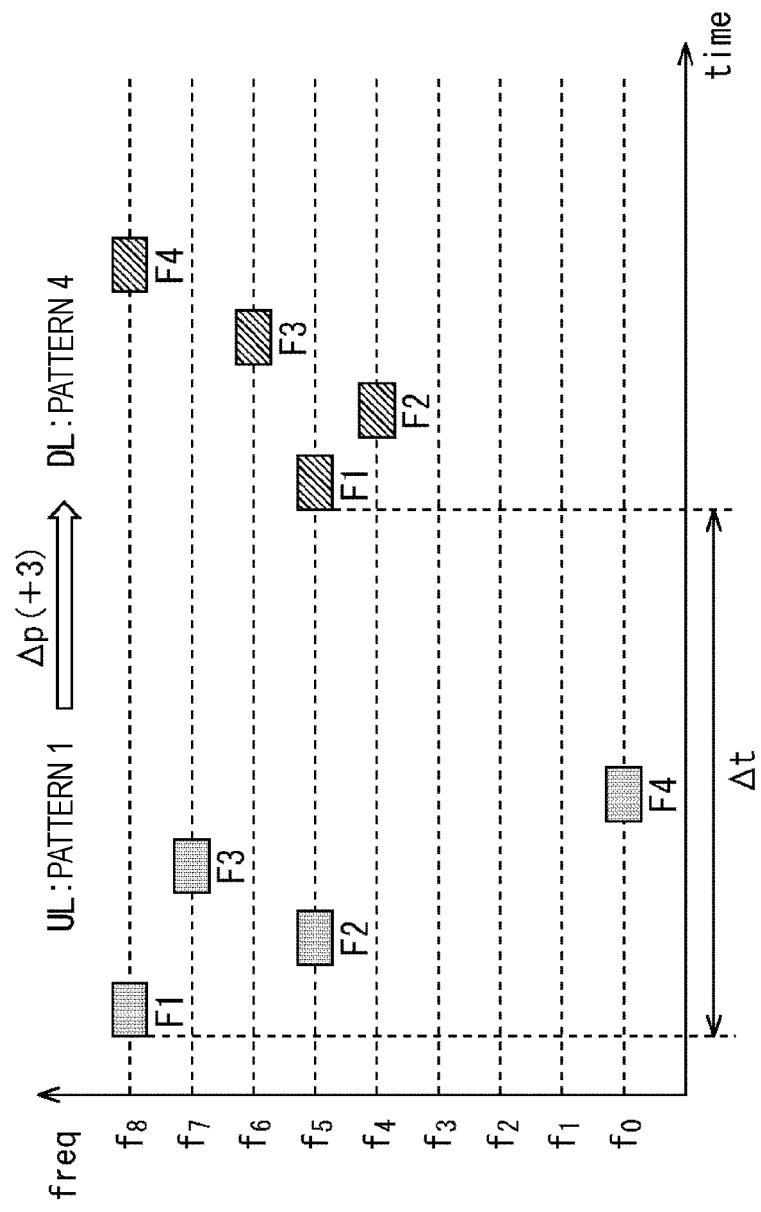
FIG. 4 is a view illustrating an example of a wireless resource to be used by a user terminal.

FIG. 4 is a view illustrating an example of a wireless resource to be used by the user terminal 11.

In FIG. 4, a vertical axis represents a frequency, and a horizontal axis represents a time. Furthermore, a rectangle represents a frame. This similarly applies to subsequent figures.

The user terminal 11 uses the pattern of pattern number 1 as the hopping pattern of the UL communication. Therefore, as the UL communication, the user terminal 11 transmits a frame F1 by using the frequency $f_8$, transmits a frame F2 by using the frequency $f_5$, transmits a frame F3 by using the frequency $f_7$, and transmits a frame F4 by using the frequency $f_0$.

In the DL communication, there is used a wireless resource indicated by a pattern of pattern number 4, which is obtained by adding ΔP (=3) to pattern number 1 used in the UL communication, after Δt from a transmission start time of the head frame F1 to be repeatedly transmitted as the UL communication.

Therefore, as the DL communication, the user terminal 11 can receive the frame F1 transmitted with use of the frequency $f_5$ and receive the frame F2 transmitted with use of the frequency $f_4$. Then, the user terminal 11 can receive the frame F3 transmitted by using the frequency $f_6$ and receive the frame F4 transmitted by using the frequency $f_8$.

As described above, the wireless resource to be used in the DL communication is uniquely determined from the wireless resource used in the UL communication. Therefore, the user terminal 11 only needs to perform reception processing by using the corresponding code for the corresponding frequency, only during the time when the reception processing needs to be performed. The reception processing is processing including frame detection, synthesis, and demodulation.

<Configuration Example of Communication Device>

Figure 5:
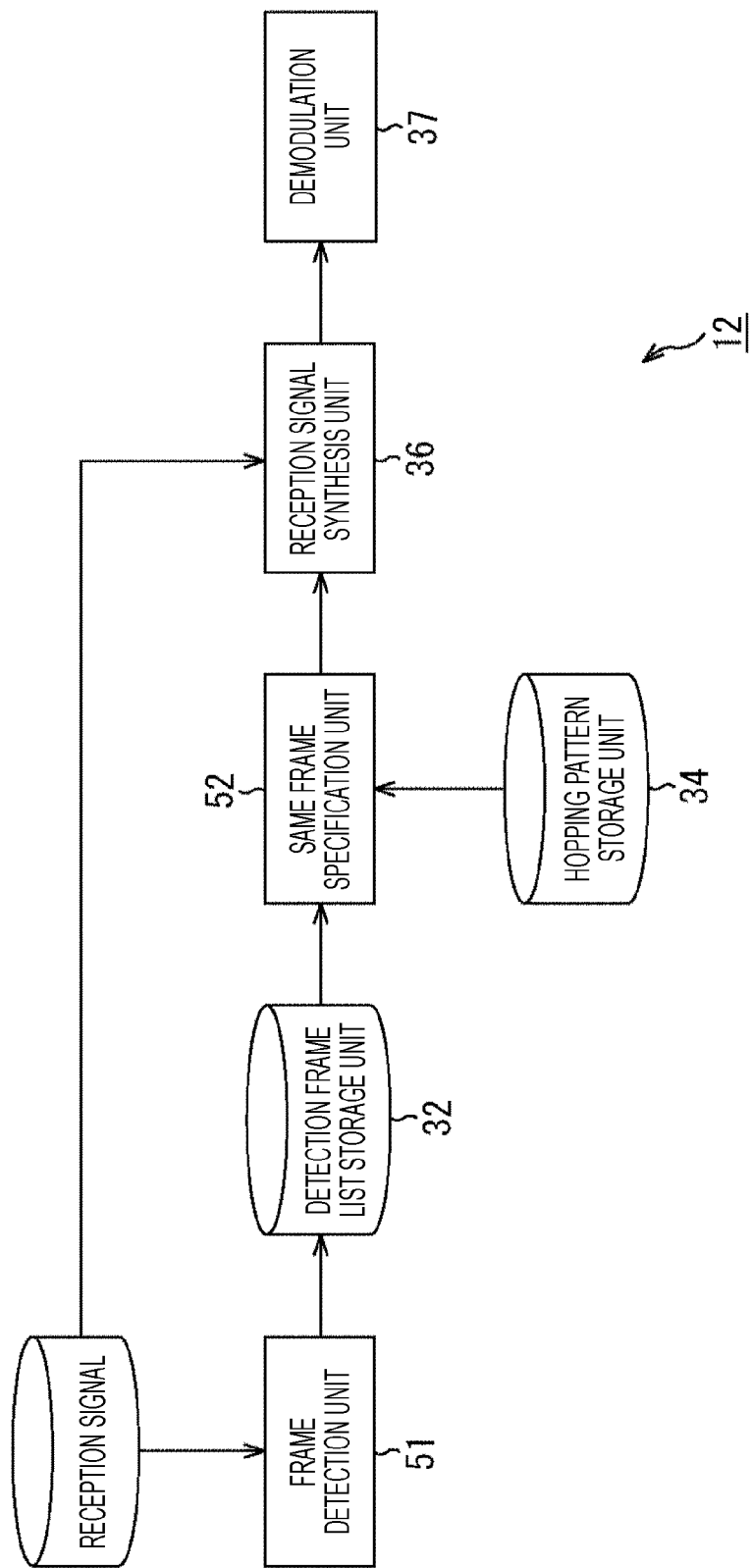
FIG. 5 is a block diagram illustrating a configuration example of the communication device.

FIG. 5 is a block diagram illustrating a configuration example of a communication device 12.

FIG. 5 illustrates a configuration example of the communication device in a case where the wireless communication system 1 is a system that performs repetitive transmission and synthesis asynchronously and without control signaling.

The communication device 12 includes a frame detection unit 51, a detection frame list storage unit 32, a hopping pattern storage unit 34, a same frame specification unit 52, a reception signal synthesis unit 36, and a demodulation unit 37. In the configuration illustrated in FIG. 5, the same components as those described with reference to FIG. 2 are denoted by the same reference numerals. Redundant description will be omitted as appropriate.

A reception signal is supplied to the frame detection unit 51 and the reception signal synthesis unit 36.

The frame detection unit 51 does not know which wireless resource is used by the user terminal 11 to transmit a frame. The frame detection unit 51 detects a frame at all times by using all usable codes for all usable frequencies.

The same frame specification unit 52 specifies a repeatedly transmitted same frame from the detected frames. Specifically, the same frame specification unit 52 refers to the detection frame list storage unit 32 and determines a focused frame, which is the frame of interest, in ascending order of a detection time.

The same frame specification unit 52 regards the focused frame as a head frame, and estimates a hopping pattern used for transmission on the basis of a frequency of the head frame and a hopping pattern. In the same frame specification unit 52, a pattern in which the frequency of the head frame matches the frequency of frame number 1 in the hopping pattern is estimated to be the hopping pattern used for the transmission. On the basis of the time and the frequency indicated by the estimated hopping pattern, the same frame specification unit 52 specifies the second and subsequent frames from among the detected frames.

The reception signal synthesis unit 36 segments a reception signal transmitted with the wireless resource specified by the same frame specification unit 52 from the received reception signal, and synthesizes the reception signal. The demodulation unit 37 demodulates the signal synthesized by the reception signal synthesis unit 36.

In a case where the demodulation is successful, the communication device 12 determines the wireless resource to be used for the DL communication by a method similar to that of the user terminal 11, on the basis of the detection time of the focused frame and the estimated hopping pattern. The communication device 12 transmits the frame by using the determined wireless resource.

<Example of Case where Head Frame is Detected>

Figure 6:
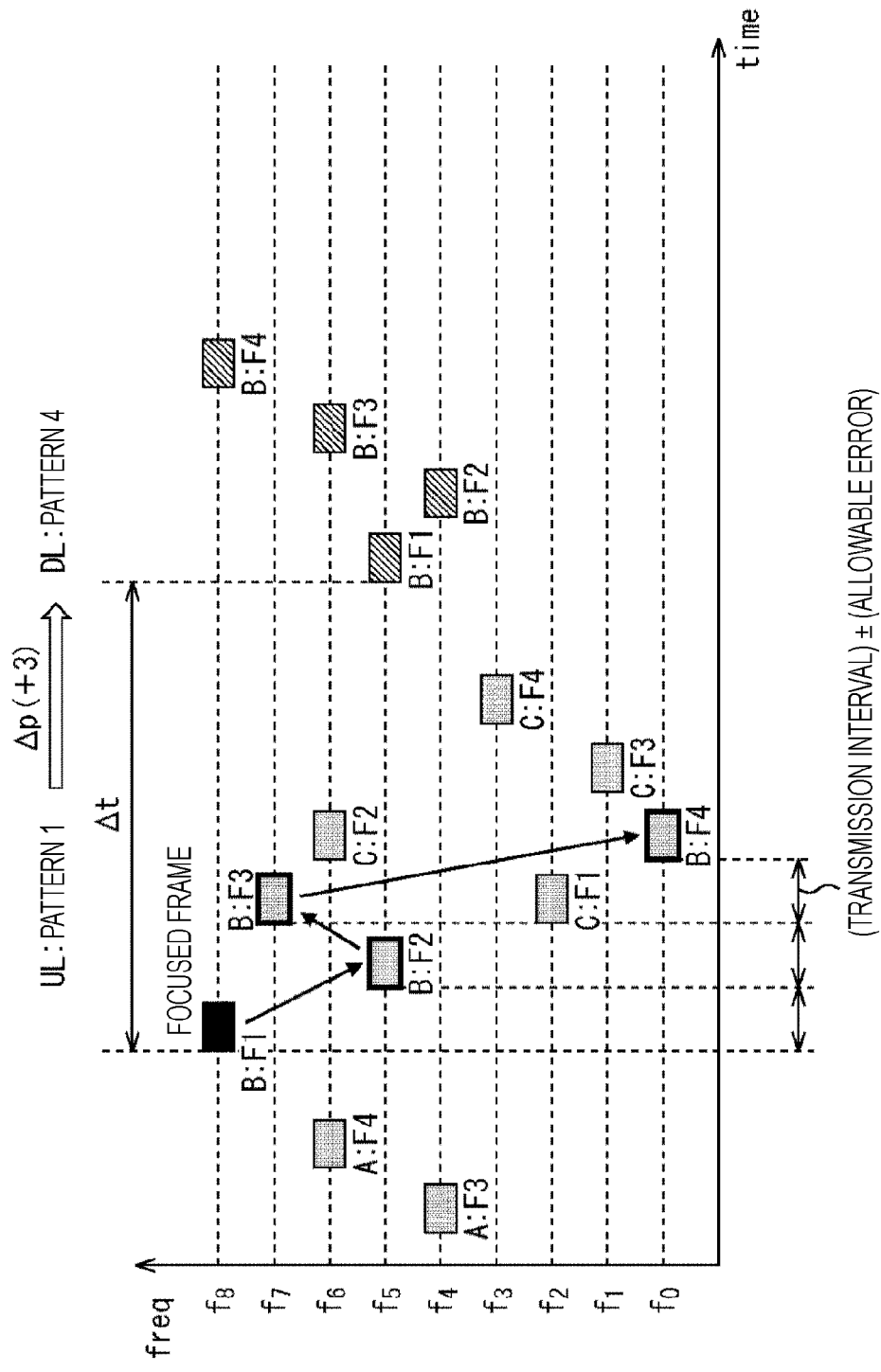
FIG. 6 is a view illustrating an example of a wireless resource to be used by the communication device.

FIG. 6 is a view illustrating an example of a wireless resource to be used by the communication device 12.

As illustrated in FIG. 6, the communication device 12 sequentially detects a frame B:F1, a frame B:F2, a frame C:F1, a frame B:F3, a frame C:F2, a frame B:F4, a frame C:F3, and a frame C:F4, as the UL communication.

The frame B:F1, the frame B:F2, the frame B:F3, and the frame C:F4 are frames transmitted from the user terminal 11 that is the reception target. The frame C:F1, the frame C:F2, the frame C:F3, and the frame C:F4 are frames transmitted from the user terminal 11 different from the user terminal 11 that is the reception target.

The communication device 12 determines the frame B:F1 with the earliest detection time, as the focused frame. The communication device 12 regards the focused frame as the head frame. The communication device 12 estimates, as a hopping pattern used for transmission, a hopping pattern (pattern of pattern number 1 in FIG. 3) in which the same frequency as the frequency $f_8$ of the frame B:F1 that is the head frame is used for frame number 1.

The communication device 12 performs pattern matching on the detected frame by using the pattern (frequencies $f_8$, $f_5$, $f_7$, and $f_0$) of pattern number 1. As a result of the pattern matching, the communication device 12 specifies the frame B:F2, the frame B:F3, and the frame B:F4 received using the frequency $f_5$, the frequency $f_7$, and the frequency $f_0$, as the same frame.

Note that an interval between a detection time of the frame B:F1 and a detection time of the frame B:F2, an interval between a detection time of the frame B:F2 and a detection time of the frame B:F2, and an interval between a detection time of the frame B:F3 and a detection time of the frame B:F4 are time intervals in which an allowable error is added or subtracted for each transmission interval.

Furthermore, the communication device 12 determines the transmission start time of the DL communication to be after $\Delta t$ from the transmission start time of the head frame B:F1 to be repeatedly transmitted. The communication device 12 determines the frequency of the DL communication as the frequency of the pattern of pattern number 4 obtained by adding $\Delta P$ (=3) to pattern number 1 used in the UL communication. The communication device 12 can receive, as the DL communication, the frame B:F1, the frame B:F2, the frame B:F3, and the frame B:F4 by using the wireless resource (frequencies $f_5$, $f_4$, $f_6$, and $f_8$) indicated by the determined pattern of pattern number 4.

As described above, by regarding a frame having the earliest detection time as a head frame, and performing pattern matching on the detected frame by using the hopping pattern, the repeatedly transmitted same frame can be specified.

However, the communication device 12 cannot always detect the head frame of the repetitive transmission, due to an influence of interference or the like.

<Example of Case where Detection of Head Frame Fails>

Figure 7:
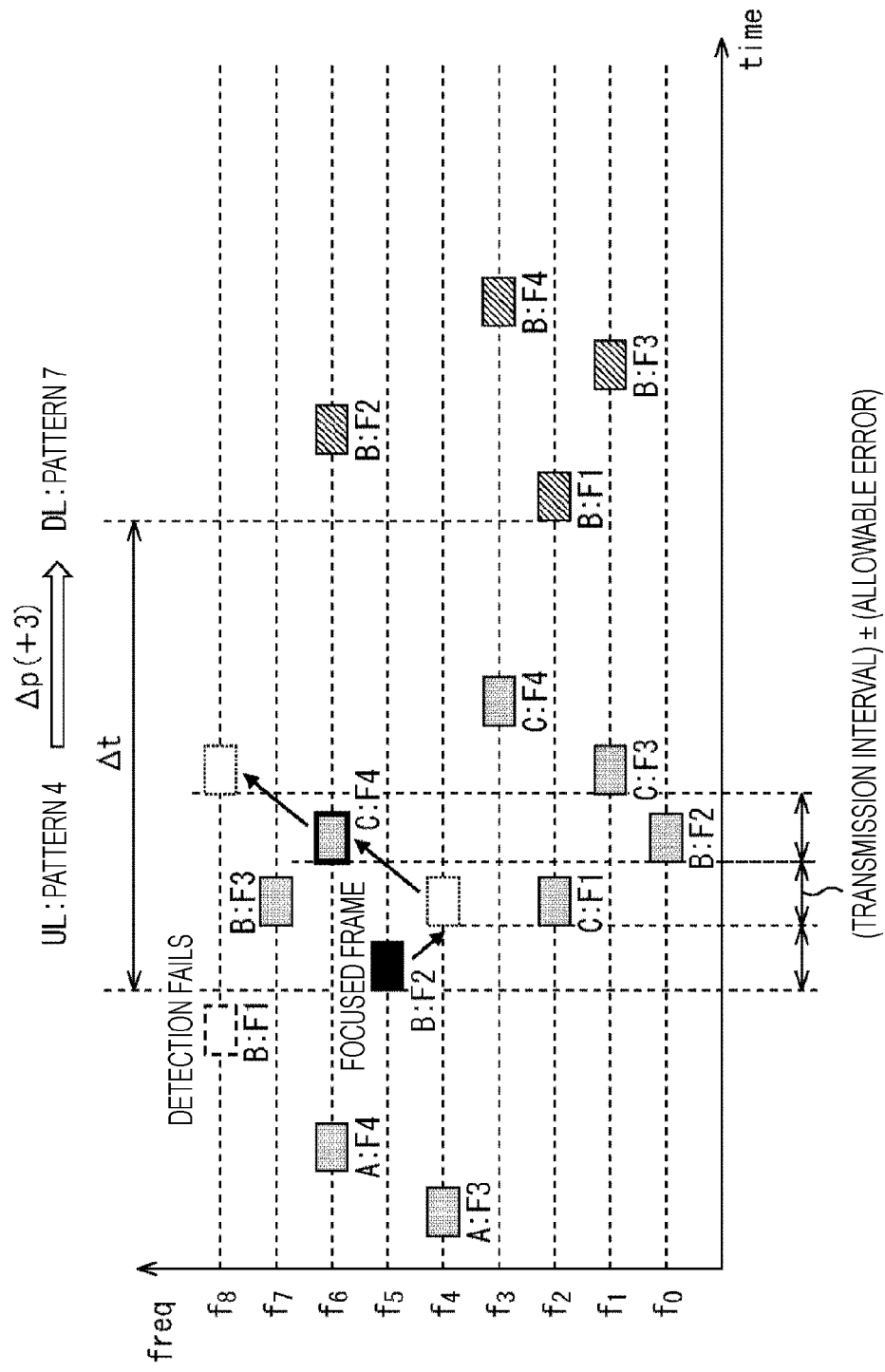
FIG. 7 is a view illustrating an example of a wireless resource to be used by the communication device in a case where detection of a head frame fails.

FIG. 7 is a view illustrating a state of a wireless resource to be used by the communication device 12 in a case where detection of the head frame fails.

In a case where detection of the frame B:F1 of the head frame fails, the communication device 12 determines the frame B:F2 having the earliest detection time as the focused frame. The communication device 12 regards the focused frame as the head frame. The communication device 12 is to estimate, as a hopping pattern used for transmission, a hopping pattern (pattern number 4 in FIG. 3) in which the same frequency as the frequency $f_8$ of the frame B:F2 that is the head frame is used for frame number 1.

The communication device 12 performs pattern matching on the detected frame by using the pattern (frequencies $f_5$, $f_4$, $f_6$, and $f_8$) of pattern number 4. As a result of the pattern matching, a frame received by using the frequency $f_4$ has not been detected. A frame received by using the frequency $f_6$ is the frame C:F4. A frame received by using the frequency $f_8$ has not been detected. Therefore, the communication device 12 specifies the frame C:F4, which is the frame received by using the frequency $f_6$, as the same frame.

That is, as a result of the pattern matching, the communication device 12 erroneously specifies and synthesizes the frame C:F4 transmitted from different user terminals 11, as the same frame.

Furthermore, the communication device 12 is to determine the transmission start time of the DL communication to be after $\Delta t$ from the transmission start time of the head frame B:F2 to be repeatedly transmitted. The communication device 12 is to determine, as the frequency of the DL communication, the pattern of pattern number 7, which is obtained by adding $\Delta P$ (=3) to pattern number 4 used in the UL communication. The pattern of pattern number 7 is frequencies $f_2$, $f_6$, $f_1$, and $f_3$ as indicated by frames B:F1 to B:F4 of the DL communication of FIG. 7.

However, the actual head frame is the frame B:F1. In a case where the head frame is the frame B:F1, the transmission start time of the DL communication is after $\Delta t$ from the transmission start time of the head frame B:F1 to be repeatedly transmitted, as illustrated in FIG. 6. Furthermore, in a case where the head frame is the frame B:F1, the hopping pattern to be actually used in the DL communication is the pattern (frequencies $f_5$, $f_4$, $f_6$, and $f_8$) of pattern number 4 as illustrated in the frames B:F1 to B:F4 of the DL communication of FIG. 6.

Therefore, the wireless resources used by the communication device 12 and the user terminal 11 do not match, and the user terminal 11 cannot receive a DL frame, which is the frame for the DL communication.

Therefore, it is necessary to specify the same frame by regarding frames of frame number 2 to a frame number obtained by subtracting 1 from number of times of repetitive transmission as frames that may be the head frame, in addition to regarding the frame with the earliest detection time as the head frame.

However, in this method, the number of patterns for specifying the same frame increases. As a result, there are concerns about an increase in a reception processing time due to an increase in the search time for specifying the same frame and an increase in an operation amount of the base station due to an increase in the number of combinations of the same frame to be demodulated.

Therefore, in the present technology, there is used a code hopping pattern that is limited such that the frame number for repetitive transmission is uniquely determined on the basis of the code. As a result, the reception side can uniquely determine what number of frames a detected frame is.

3. Third Embodiment (Example of Specifying Frame Number on Basis of Code)

<Configuration Example of Wireless Communication System>

Figure 8:
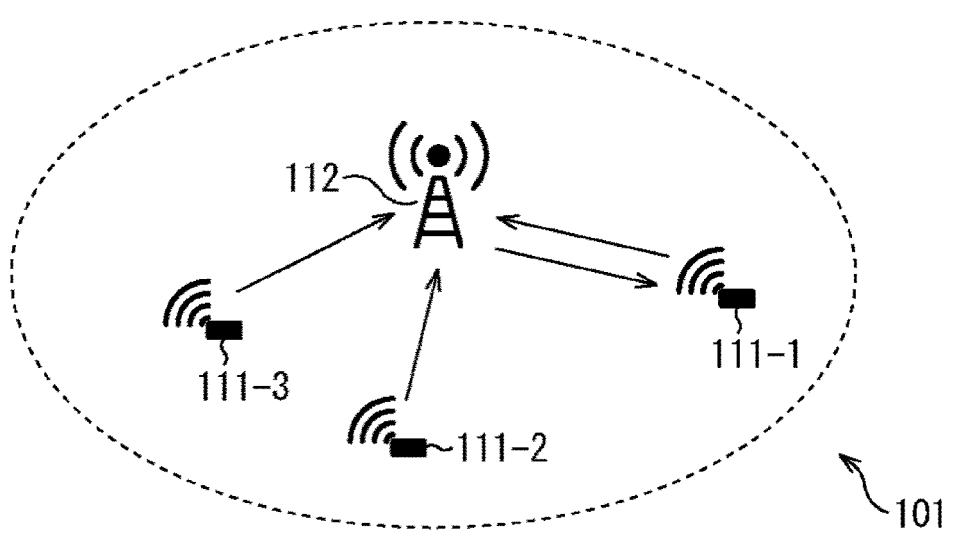
FIG. 8 is a block diagram illustrating another configuration example of the wireless communication system of the present technology.

FIG. 8 is a block diagram illustrating a configuration example of a wireless communication system according to a third embodiment of the present technology.

A wireless communication system 101 of FIG. 8 is configured by connecting user terminals 111-1 to 111-3 and a communication device 112 by wireless communication.

The wireless communication between the user terminals 111-1 to 111-3 and the communication device 112 is two-way communication including UL communication from the user terminals 111-1 to 111-3 to the communication device 112 and DL communication from the communication device 112 to the user terminals 111-1 to 111-3.

The user terminals 111-1 to 111-N are IoT devices including one or more sensors. The user terminals 111-1 to 111-N include at least one sensor of, for example, a camera, a microphone, an acceleration sensor, an angular velocity sensor, a geomagnetic sensor, an illuminance sensor, a temperature sensor, a humidity sensor, a moisture sensor, an optical sensor, an atmospheric pressure sensor, a positioning sensor, and the like.

Hereinafter, in a case where it is not necessary to individually distinguish the user terminals 111-1 to 111-3, they are collectively referred to as a user terminal 111, as appropriate.

In the wireless communication system 101, the user terminal 111 and the communication device 112 share a frequency hopping pattern, a code hopping pattern, and a time hopping pattern. The frequency hopping pattern, the code hopping pattern, and the time hopping pattern are configured such that a frame number is specified on a reception side on the basis of the code.

For example, as the UL communication, the user terminal 111 measures a measurement target and transmits a data frame containing sensor data representing a measurement result, to the communication device 112.

The user terminal 111 selects a wireless resource by using each frequency hopping pattern, a code, and a time. The user terminal 111 repeatedly transmits a same frame, which is a same data frame, for example, four times by using the selected wireless resource.

Furthermore, the user terminal 111 determines a wireless resource of the DL communication on the basis of the wireless resource used in the UL communication. The user terminal 111 receives, as the DL communication, the same frame being transmitted from the communication device 112 by using the wireless resource of the DL communication.

The communication device 112 constitutes a base station. The communication device 112 detects a frame being transmitted from the user terminal 111. The communication device 112 specifies the same frame from the detected frames by using the hopping pattern.

The communication device 112 determines the hopping pattern by specifying a frame number of the detected frame on the basis of the code. The communication device 112 specifies the same frame by pattern matching between the detected frame and the determined hopping pattern. The communication device 112 synthesizes the specified same frame and performs demodulation.

Furthermore, the communication device 112 determines the wireless resource of the DL communication on the basis of the wireless resource used in the UL communication, and transmits the data frame to the user terminal 111 by using the wireless resource of the DL communication, as the DL communication.

As described above, the frame number of the detected frame is specified on the basis of the code. As a result, it is possible to accurately specify the same frame without time synchronization or transmission of a control frame.

<Configuration Example of User Terminal>

Figure 9:
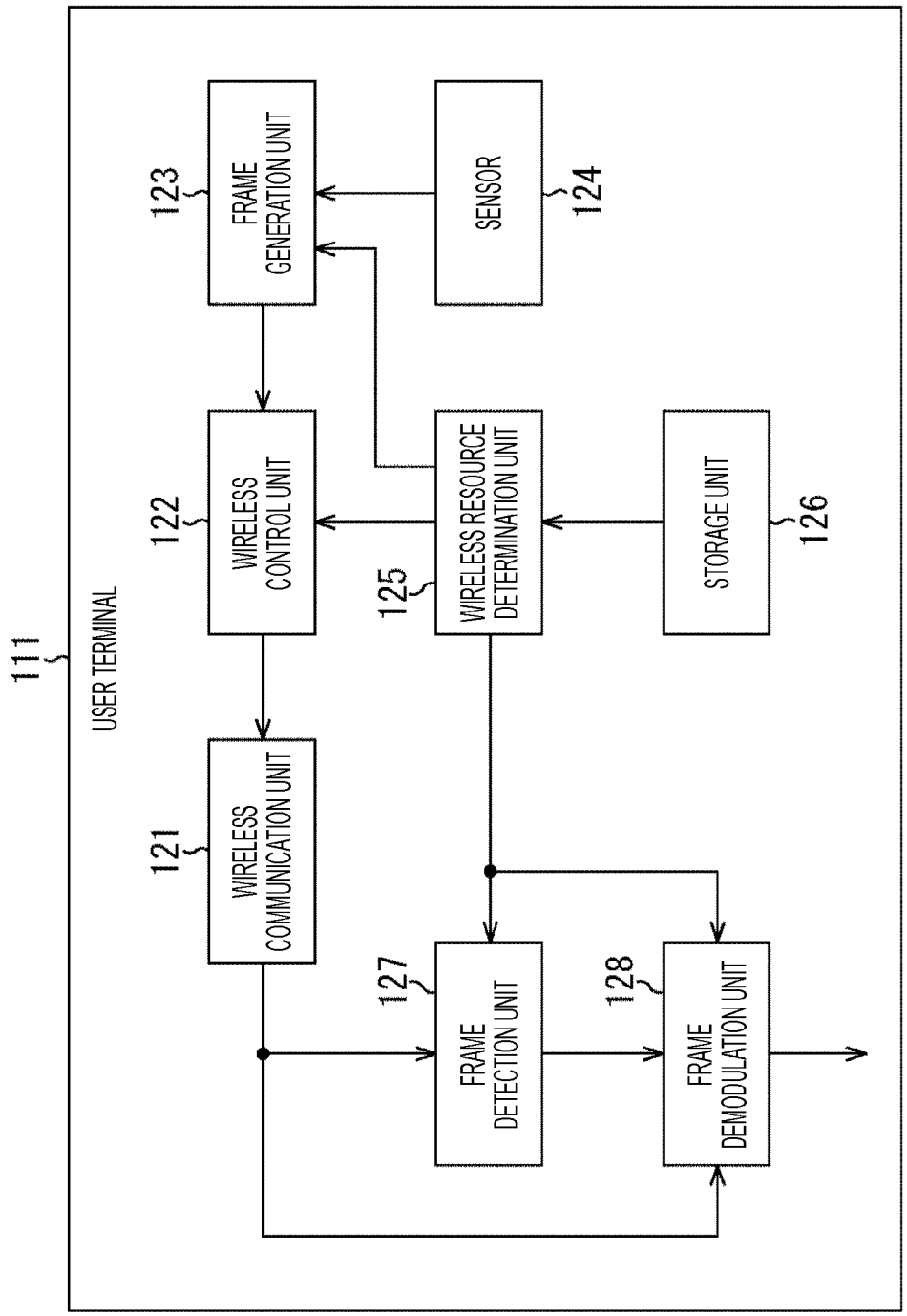
FIG. 9 is a block diagram illustrating a configuration example of the user terminal.

FIG. 9 is a block diagram illustrating a configuration example of the user terminal 111.

The user terminal 111 includes a wireless communication unit 121, a wireless control unit 122, a frame generation unit 123, a sensor 124, a wireless resource determination unit 125, a storage unit 126, a frame detection unit 127, and a frame demodulation unit 128.

The wireless communication unit 121 transmits and receives wireless signals to and from the communication device 112. In accordance with a control signal supplied from the wireless control unit 122, the wireless communication unit 121 converts a frame generated by the frame generation unit 123 into a wireless signal, and transmits to the communication device 112.

In accordance with a control signal supplied from the wireless control unit 122, the wireless communication unit 121 receives a wireless wave being transmitted from the communication device 12, and converts into a wireless signal. The wireless communication unit 121 outputs the converted wireless signal to the frame detection unit 127 and the frame demodulation unit 128.

The wireless control unit 122 includes a central processing unit (CPU), a read only memory (ROM), a random access memory (RAM), and the like. The wireless control unit 122 executes a program stored in the ROM or the like, and controls the wireless communication unit 121.

The wireless control unit 122 controls the wireless communication unit 121 to transmit a frame supplied from the frame generation unit 123, by using a transmission time and a transmission frequency supplied from the wireless resource determination unit 125. Furthermore, the wireless control unit 122 controls the wireless communication unit 121 to receive a frame, by using a reception time and a reception frequency supplied from the wireless resource determination unit 125, as necessary.

The frame generation unit 123 generates a data frame including sensor data supplied from the sensor 124, and outputs the generated data frame to the wireless control unit 122. For generating the data frame, a code supplied from the wireless resource determination unit 125 is used.

The sensor 124 measures information outside and inside the terminal, and outputs sensor data indicating a measurement result to the frame generation unit 123.

The wireless resource determination unit 125 determines a wireless resource for transmission of each data frame, by using the hopping pattern acquired from the storage unit 126. The wireless resource determination unit 125 individually generates a preamble/SYNC and a scramble pattern by using the determined code as an initial value. Furthermore, the wireless resource determination unit 125 determines the wireless resource to be used for the DL communication on the basis of the wireless resource used for the UL communication.

The storage unit 126 stores a hopping pattern to be used for determining a wireless resource.

The frame detection unit 127 detects a frame from a reception signal supplied from the wireless communication unit 121. Specifically, the frame detection unit 127 extracts a signal of a target frequency from a wide area signal from the reception signal supplied from the wireless communication unit 121, and generates a known pattern by using the preamble/SYNC and the scramble pattern.

The frame detection unit 127 calculates a correlation value between the signal and the known pattern, and determines that a frame has been detected in a case where the correlation value is a certain value or more. In a case where the frame detection is successful, the frame detection unit 127 outputs the detected wireless resource to the frame demodulation unit 128.

The frame demodulation unit 128 synthesizes and demodulates the frame by using the reception signal supplied from the wireless communication unit 121. Specifically, the frame demodulation unit 128 extracts a signal of a portion corresponding to the frame from the reception signal, on the basis of a wireless resource corresponding to the number of frames detected by the frame detection unit 127.

The frame demodulation unit 128 descrambles the extracted signal with the scramble pattern supplied from the wireless resource determination unit 125, and synthesizes the descrambled signal. The frame demodulation unit 128 extracts a Payload from the synthesized signal, and performs error correction code decoding processing and error detection processing using CRC. In a case where the frame demodulation is successful, the frame demodulation unit 128 notifies an upper layer of data.

Note that, in a case where the DL communication is not performed, the user terminal 111 may be configured without the frame detection unit 127 and the frame demodulation unit 128.

<Configuration Example of Communication Device>

Figure 10:
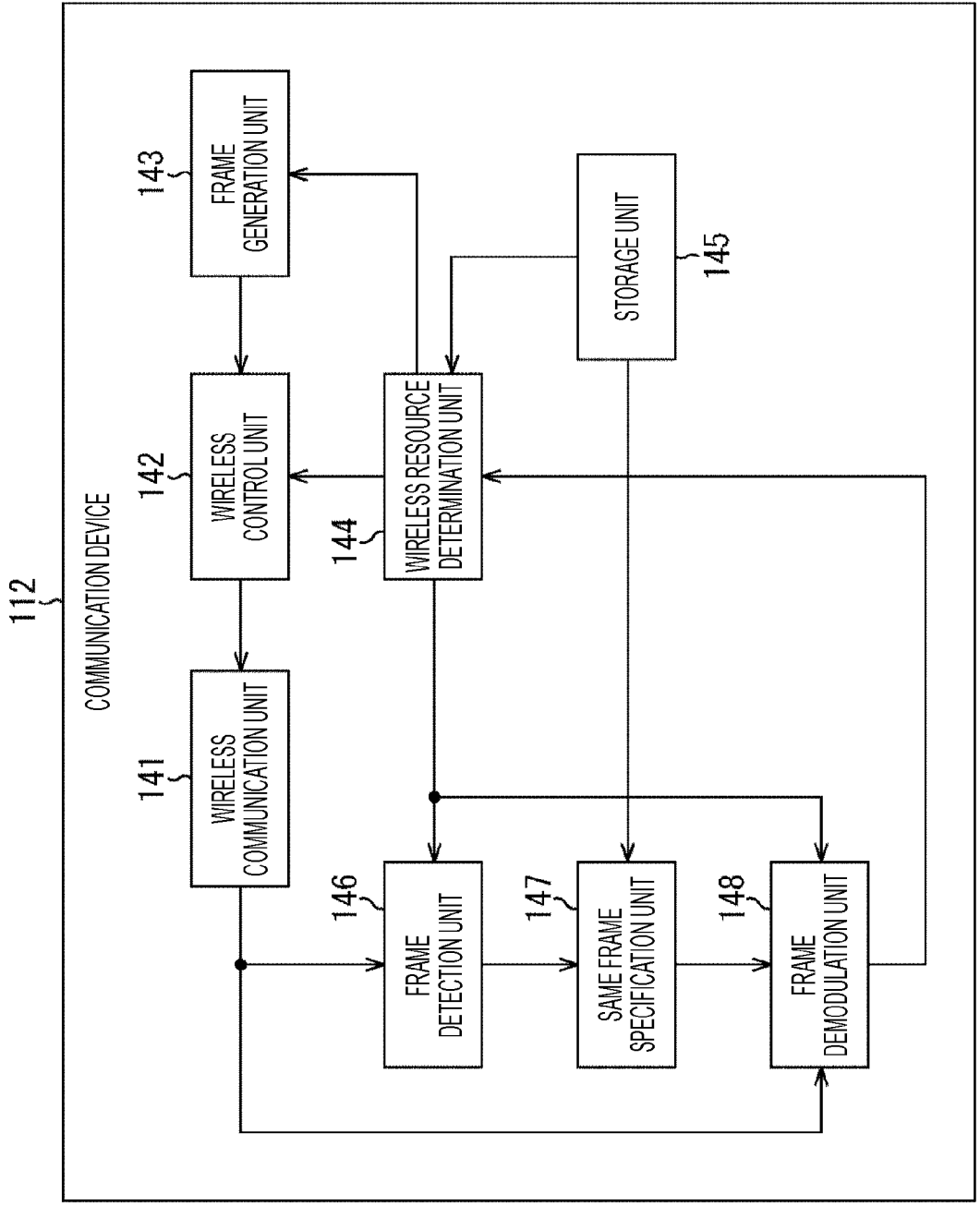
FIG. 10 is a block diagram illustrating a configuration example of the communication device.

FIG. 10 is a block diagram illustrating a configuration example of the communication device 112.

The communication device 112 includes a wireless communication unit 141, a wireless control unit 142, a frame generation unit 143, a wireless resource determination unit 144, a storage unit 145, a frame detection unit 146, a same frame specification unit 147, and a frame demodulation unit 148.

The wireless communication unit 141 transmits and receives wireless signals to and from the user terminal 111. The wireless communication unit 141 receives a wireless wave being transmitted from the user terminal 111 in accordance with a control signal supplied from the wireless control unit 142, and converts into a wireless signal. The wireless communication unit 141 outputs the converted wireless signal to the frame detection unit 146 and the frame demodulation unit 148.

In accordance with a control signal supplied from the wireless control unit 142, the wireless communication unit 141 converts a frame generated by the frame generation unit 143 into a wireless signal, and transmits to the user terminal 111.

The wireless control unit 142 includes a CPU, a ROM, a RAM, and the like. The wireless control unit 142 executes a program stored in the ROM or the like, and controls the wireless communication unit 141.

The wireless control unit 142 controls the wireless communication unit 141 to receive a frame, by using a reception time and a reception frequency supplied from the wireless resource determination unit 144. Furthermore, the wireless control unit 142 controls the wireless communication unit 141 to transmit a frame supplied from the frame generation unit 143, by using a transmission time and a transmission frequency supplied from the wireless resource determination unit 144, as necessary.

The frame generation unit 143 generates a data frame to be transmitted by the communication device 112, by using a code supplied from the wireless resource determination unit 144. The frame generation unit 143 outputs the generated data frame to the wireless control unit 142.

The wireless resource determination unit 144 determines a wireless resource (a frequency, a time, and a code) for transmission of each data frame, by using the hopping pattern acquired from the storage unit 145. The wireless resource determination unit 144 individually generates a preamble/SYNC and a scramble pattern by using the determined code as an initial value.

Furthermore, the wireless resource determination unit 144 has a DL transmission list in which a terminal ID and the wireless resource that is to be used for the DL transmission are registered. The wireless resource determination unit 144 determines the wireless resource to be used for the DL communication on the basis of the wireless resource used for the UL communication. The wireless resource determination unit 144 registers the terminal ID and the wireless resource that is to be used for the DL transmission, in the DL transmission list.

The wireless resource determination unit 144 extracts a wireless resource of the DL transmission list, and outputs a code in the wireless resource to the frame generation unit 143. The wireless resource determination unit 144 outputs a frequency and a time in the wireless resource to the wireless control unit 142.

The storage unit 145 stores a hopping pattern to be used for determining a wireless resource.

The frame detection unit 146 detects a frame from a reception signal supplied from the wireless communication unit 141. A method of detecting the frame is similar to the method of detecting a frame in the frame detection unit 127 in FIG. 9.

In a case where the frame detection is successful, the frame detection unit 146 registers information on the detected wireless resource as an entry, in a detection frame list included in the same frame specification unit 147.

The same frame specification unit 147 has the detection frame list in which wireless resources of detected frames are registered. The same frame specification unit 147 specifies the repeatedly transmitted same frame from the detected frames by using the information on the wireless resource in the detection frame list and the hopping pattern acquired from the storage unit 145.

In a case where the same frame is successfully specified, the same frame specification unit 147 registers information on the wireless resource of the specified same frame as an entry in a same frame list included in the frame demodulation unit 148.

The frame demodulation unit 148 has the same frame list in which wireless resources of the same frame are registered. In a case where there is a plurality of entries in the same frame list, the frame demodulation unit 148 synthesizes and demodulates the frame by using a reception signal supplied from the wireless communication unit 121. A method of synthesizing and demodulating the frame is a method of synthesizing and demodulating similar to the method of synthesizing and demodulating in the frame demodulation unit 128 in FIG. 9.

In a case where the frame demodulation is successful, the frame demodulation unit 148 notifies an upper layer of data. Furthermore, in a case where the frame demodulation is successful, the frame demodulation unit 148 outputs the wireless resource of the same frame to the wireless resource determination unit 144 as the wireless resource of the UL communication.

Note that, in a case where the DL communication is not performed, the communication device 112 may be configured without the frame generation unit 143.

<Configuration Example of Frame>

Figure 11:
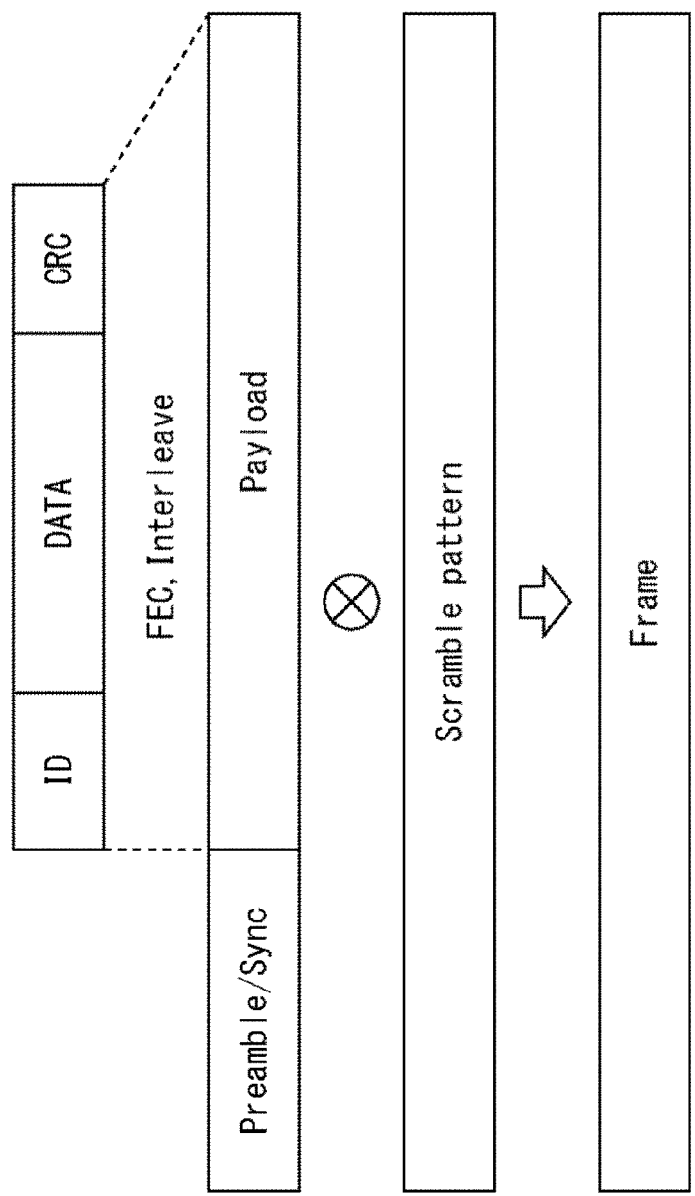
FIG. 11 is a view illustrating a configuration example of a frame.

FIG. 11 is a view illustrating a configuration example of a frame transmitted and received by the wireless communication system 101.

The frame includes fields of Preamble/SYNC and Payload. The Payload has fields such as ID, DATA, and cyclic redundancy check (CRC).

The ID includes a terminal-specific identifier. The DATA contains sensor data. The CRC contains a value that is calculated for the ID and the DATA and to be used for determining reception success on a reception side.

The frame generation unit 123 and the frame generation unit 143 perform error correction and interleave on a sequence in which the ID, the DATA, and the CRC are concatenated, and generates the Payload.

After concatenating the Payload and the Preamble/SYNC of the data frame, the frame generation unit 123 and the frame generation unit 143 take an exclusive OR for every bit with a scramble pattern of the data frame, and generate a data frame (frame).

The preamble/SYNC and the scramble pattern used in the frame are patterns generated from (an initial value of) a code in the wireless resource determination unit 125 and the wireless resource determination unit 144.

<Example of Hopping Pattern>

Next, a hopping pattern to be used for generating a wireless resource will be described. In the wireless communication system 101 of FIG. 7, a hopping pattern is defined for each of the time, the frequency, and the code. Note that, in the following figures, an example of the number of times of repetitive transmission is four is shown.

<Time Hopping Pattern>

FIG. 12 is a table illustrating an example of a time hopping pattern.

The time hopping pattern indicates a transmission interval at which each frame is repeatedly transmitted. In a case of the third embodiment, the number of patterns is limited to one. A value of the transmission interval is not particularly limited.

In a case of FIG. 12, the time hopping pattern includes one pattern. In a case where the pattern of pattern number 1 is selected, transmission interval 0, transmission interval $T_1$, transmission interval $T_1$, and transmission interval $T_1$ are used to transmit frames of frame numbers 1 to 4, respectively.

<Frequency Hopping Pattern>

FIG. 13 is a table illustrating an example of a frequency hopping pattern.

The frequency hopping pattern indicates a frequency to be used for each frame to be repeatedly transmitted. FIG. 13 illustrates a pattern in which there are nine usable frequencies and all the frequencies are uniformly assigned. The frequency hopping pattern is not limited to the example of FIG. 13.

In a case where a pattern of pattern number 1 is selected, frequencies $f_3$, $f_5$, $f_7$, and $f_0$ are used to transmit frames of frame numbers 1 to 4, respectively. In a case where the pattern of pattern number 2 is selected, frequencies $f_7$, $f_8$, $f_0$, and $f_5$ are used to transmit the frames of frame numbers 1 to 4, respectively. In a case where the pattern of pattern number 3 is selected, frequencies $f_6$, $f_3$, $f_3$, and $f_2$ are used to transmit the frames of frame numbers 1 to 4, respectively. In a case where the pattern of pattern number 4 is selected, frequencies $f_5$, $f_4$, $f_6$, and $f_3$ are used to transmit the frames of frame numbers 1 to 4, respectively.

In a case where the pattern of pattern number 5 is selected, frequencies $f_4$, $f_1$, $f_2$, and $f_7$ are used to transmit the frames of frame numbers 1 to 4, respectively. In a case where the pattern of pattern number 6 is selected, frequencies $f_3$, $f_0$, $f_5$, and $f_1$ are used to transmit the frames of frame numbers 1 to 4, respectively. In a case where the pattern of pattern number 7 is selected, frequencies $f_2$, $f_6$, $f_1$, and $f_3$ are used to transmit the frames of frame numbers 1 to 4, respectively.

In a case where the pattern of pattern number 8 is selected, frequencies $f_1$, $f_7$, $f_4$, and $f_6$ are used to transmit the frames of frame numbers 1 to 4, respectively. In a case where the pattern of pattern number 9 is selected, frequencies $f_0$, $f_2$, $f_3$, and $f_4$ are used to transmit the frames of frame numbers 1 to 4, respectively.

<Hopping Pattern of Code>

FIG. 14 is a table illustrating an example of a code hopping pattern.

The code hopping pattern indicates a combination of initial values to be used for generating a preamble/SYNC and a scramble pattern to be used for generating each frame to be repeatedly transmitted. In the third embodiment, it is necessary to limit such that a frame number for repetitive transmission is uniquely determined on the basis of a code. The number of patterns is not limited, and a plurality of patterns may be included.

In a case of FIG. 14, the code hopping pattern includes one pattern. In a case where a pattern of pattern number 1 is selected, codes $C_1$, $C_2$, $C_3$, and $C_4$ are used to transmit frames of frame numbers 1 to 4, respectively.

Note that, $V_1$, $V_2$, $V_3$, and $V_4$ are respectively used as Value 1 to Value 4, for the code $C_1$. $V_2$, $V_3$, $V_4$, and $V_5$ are respectively used as Value 1 to Value 4, for the code $C_2$. $V_3$, $V_4$, $V_1$, and $V_2$ are respectively used as Value 1 to Value 4, for the code $C_3$. $V_4$, $V_1$, $V_2$, and $V_3$ are respectively used as Value 1 to Value 4, for the code $C_1$.

<Configuration of Pseudo Random Number Generator>

Figure 15:
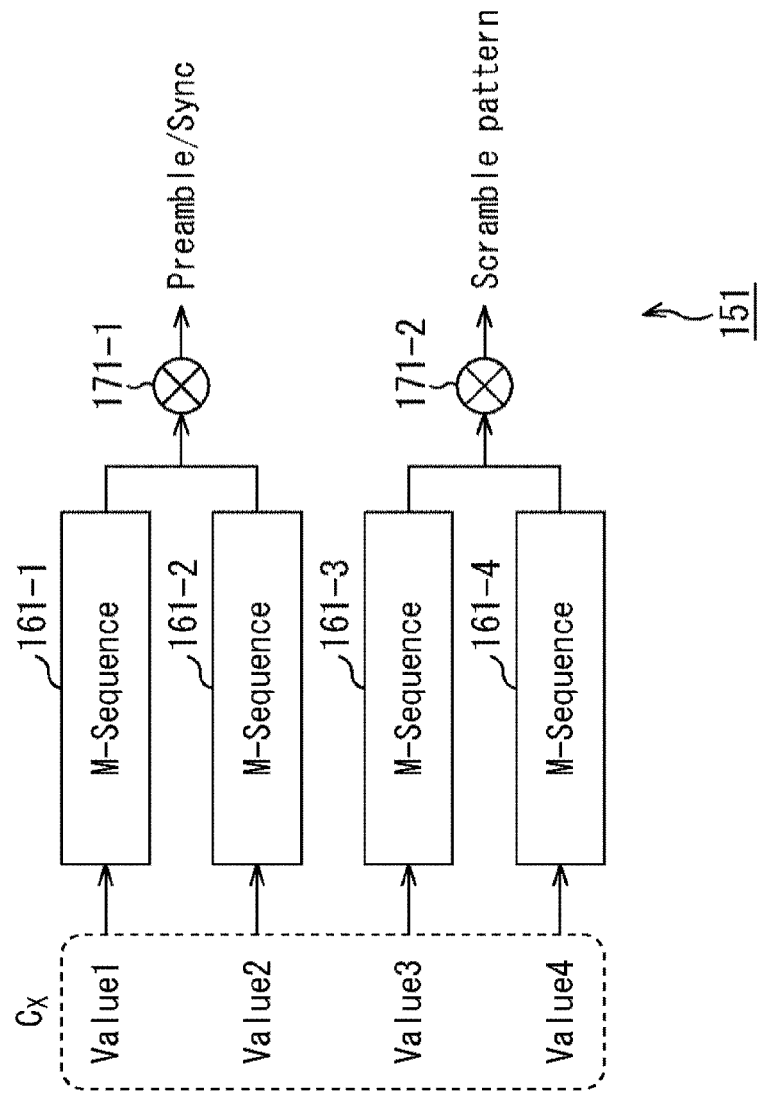
FIG. 15 is a diagram illustrating a configuration example of a gold code generator as a pseudo random number generator.

FIG. 15 is a diagram illustrating a configuration example of a gold code generator as a pseudo random number generator to be used for generating a preamble/SYNC and a scramble pattern.

The gold code generator 151 illustrated in FIG. 15 includes four pseudo random number generators 161-1 to 161-4 configured to output two M-sequences, and two exclusive OR (XOR) arithmetic units 171-1 and 171-2. This gold code generator 151 is used for the wireless resource determination unit 125 and the wireless resource determination unit 144.

Value 1 of a code C is inputted as an initial value to the pseudo random number generator 161-1. Value 2 of the code C is inputted as an initial value to the pseudo random number generator 161-2. The pseudo random number generator 161-1 and the pseudo random number generator 161-2 input the initial values to generate random numbers. A value (random number) outputted from the pseudo random number generator 161-1 is inputted to the arithmetic unit 171-1. A value (random number) outputted from the pseudo random number generator 161-2 is inputted to the arithmetic unit 171-1. The arithmetic unit 171-1 obtains a Preamble/SYNC (pseudo random number) by integrating the values supplied from the pseudo random number generators 161-1 and 161-2. At this time, the preamble/SYNC obtains a length that matches a preamble/SYNC length of the frame.

Similarly, Value 3 of the code C is inputted as an initial value to the pseudo random number generator 161-3. Value 4 of the code C is inputted as an initial value to the pseudo random number generator 161-4. The pseudo random number generator 161-3 and the pseudo random number generator 161-4 input the initial values to generate random numbers. A value (random number) outputted from the pseudo random number generator 161-3 is inputted to the arithmetic unit 171-2. A value (random number) outputted from the pseudo random number generator 161-2 is inputted to the arithmetic unit 171-2. The arithmetic unit 171-2 obtains a scramble pattern (pseudo random number) by integrating the values supplied from the pseudo random number generators 161-3 and 161-4. At this time, the scramble pattern obtains a length that matches a frame length.

In this way, in a case where the preamble/SYNC and the scramble pattern are generated, the known pattern to be used for frame detection is to be a different pattern except for a combination in which all of Value 1 to Value 4 have the same value.

Effects of Third Embodiment

Next, a description is given to an example in which the first frame in same frames has been unable to be detected correctly on the reception side, in a case of using a hopping pattern (FIGS. 12 to 14) limited such that the frame number for repetitive transmission is uniquely determined on the basis of the code.

FIG. 16 is a table illustrating a detection frame list in the communication device 112.

In the detection frame list of FIG. 16, information on wireless resources of detected frames of entries 1 to 7 is registered.

As entry 1, information on a wireless resource whose time is $T'+T_1$, frequency is $f_5$, and code is $C_2$ is registered. As entry 2, information on a wireless resource whose time is $T'+2T_1$, frequency is $f_2$, and code is $C_1$ is registered. As entry 3, information on a wireless resource whose time is $T'+2T_1$, frequency is $f_7$, and code is $C_3$ is registered. As entry 4, information on a wireless resource whose time is $T'+3T_1$, frequency is $f_0$, and code is $C_4$ is registered.

As entry 5, information on a wireless resource whose time is $T'+3T_1$, frequency is $f_6$, and code is $C_2$ is registered. As entry 6, information on a wireless resource whose time is $T'+4T_1$, frequency is $f_1$, and code is $C_3$ is registered. As entry 7, information on a wireless resource whose time is $T'+5T_1$, frequency is $f_3$, and code is $C_4$ is registered.

Figure 17:
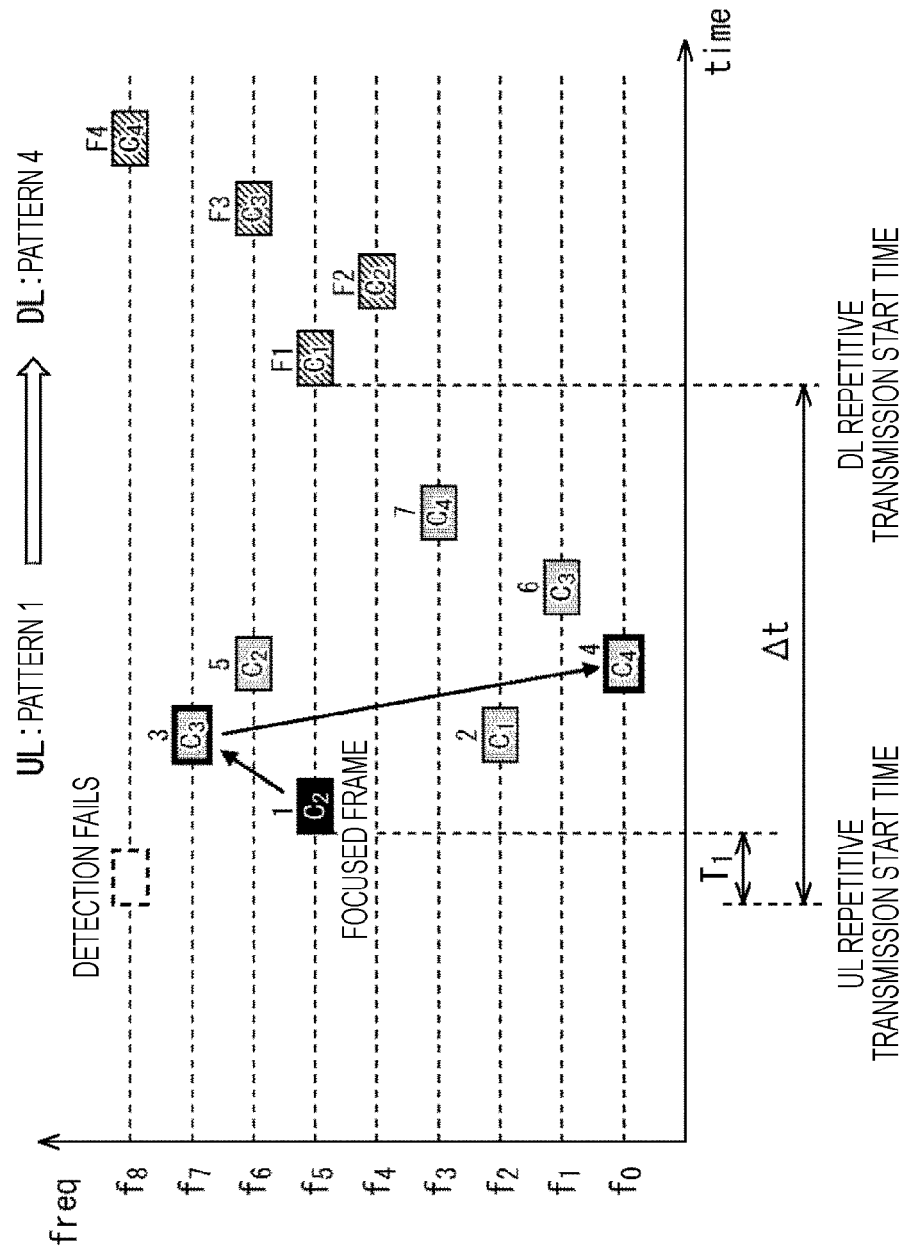
FIG. 17 is a view illustrating an example in which DL transmission is performed after a same frame is specified from detected frames.

FIG. 17 is a view illustrating an example in which the communication device 12 performs DL transmission after specifying a same frame from detected frames.

In FIG. 17, the frames of entries 1 to 7 registered in the detection frame list of FIG. 16 are assigned with entry numbers, and are shown at positions of respectively corresponding frequencies in order of detection time. Furthermore, on the right side of the DL repetitive transmission start time, frames F1 to F4 to be subjected to the DL transmission are indicated in order of respective transmission times at respective frequencies. Moreover, the frames of entries 1 to 7 and frames F1 to F4 to be subjected to the DL transmission also indicate the respective codes.

As illustrated in FIG. 17, in a case where same frame specification processing is performed with entry 1 of the detection frame list as the focused entry, the detected code is ($C_2$). Therefore, a code of the focused frame is specified as the code of frame number 2 on the basis of the code hopping pattern (FIG. 14).

Furthermore, on the basis of the frequency ($f_5$) at which the frame of the focused entry has been detected and the frequency of frame number 2 in the frequency hopping pattern (FIG. 13), the pattern used for repetitive transmission can be correctly extracted as pattern number 1.

Moreover, on the basis of a time ($T'+T_1$) at which the focused entry has been detected and a total transmission interval up to the second frame of the time hopping pattern (FIG. 12), a start time (T') of repetitive transmission of the UL communication is correctly calculated.

Here, in the wireless communication system 1, in order to determine the wireless resource to be used for the DL communication, rules shown in Equations (1) and (2), which will be described later, are defined and shared by the user terminal 111 and the communication device 112. For example, in a case of $\Delta P=2$, the user terminal 111 and the communication device 112 individually calculate pattern number 4 ($f_5$, $f_4$, $f_6$, and $f_8$) (FIG. 13) to be used for repetitive transmission of the DL communication illustrated in FIG. 17, by Equation (1) and the frequency hopping pattern (FIG. 13). Furthermore, the user terminal 111 and the communication device 112 individually calculate a start time ($T'+\Delta t$) of the repetitive transmission of the DL communication by Equation (2). In this way, since the wireless resource calculated by the user terminal 111 and to be used for the DL communication matches the wireless resource calculated by the communication device 112 and to be used for the DL communication, the user terminal 111 can receive a DL frame.

In this way, in the third embodiment of the present technology, there is used a code hopping pattern that is limited such that the frame number for repetitive transmission is uniquely determined on the basis of the code. As a result, since the reception side uniquely determines what number of frames a detected frame is, it is possible to correctly specify a same frame only by performing pattern matching once for the focused frame.

<Operation of Entire Wireless Communication System>

Figure 18:
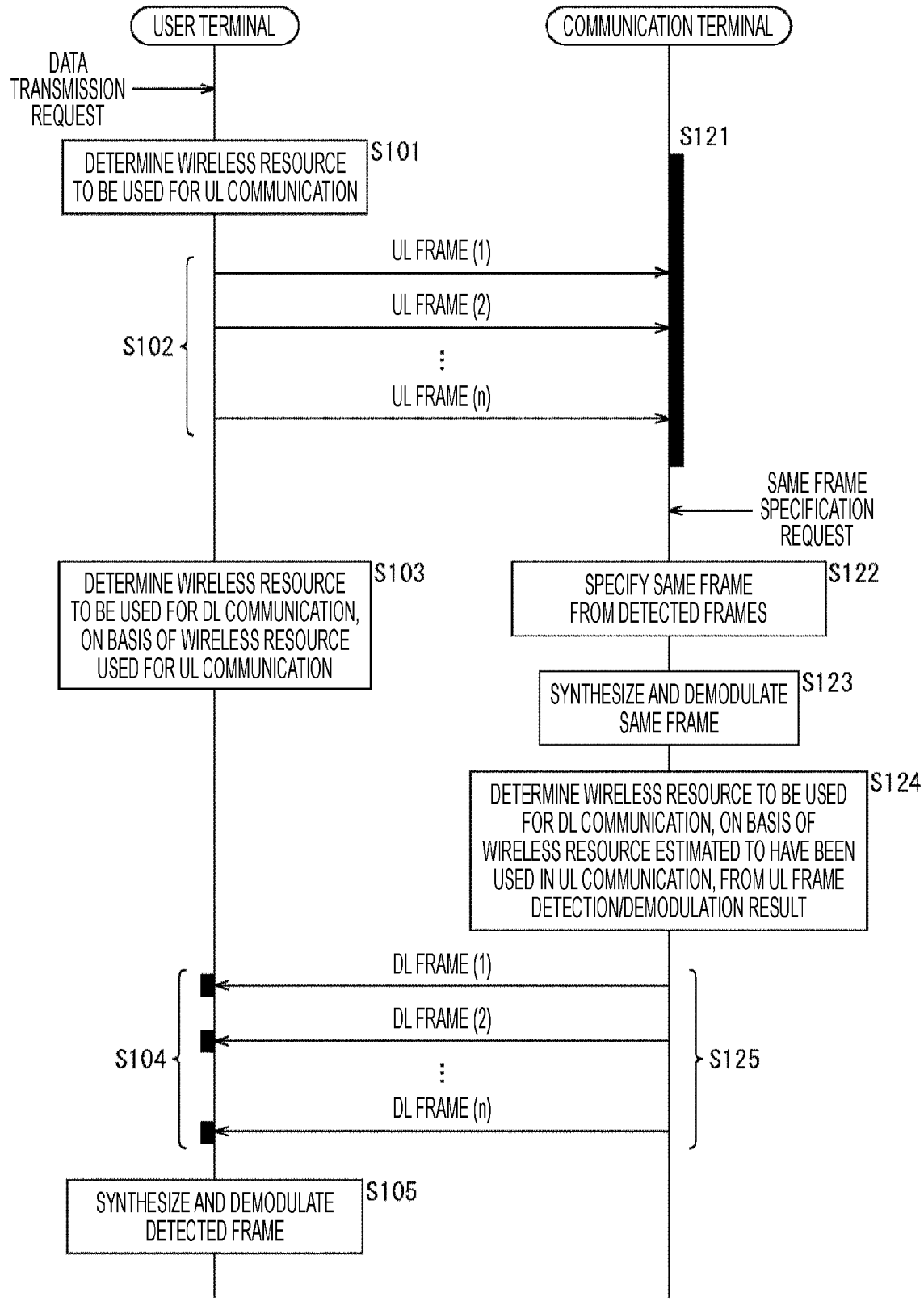
FIG. 18 is a flowchart for explaining processing of the entire wireless communication system.

FIG. 18 is a flowchart for explaining processing of the entire wireless communication system 101.

When receiving a data transmission request from an upper layer, the user terminal 111 starts the processing of FIG. 18.

In step S101, the user terminal 111 determines a wireless resource to be used for UL communication.

In step S102, the user terminal 111 repeatedly transmits UL frames (1 to n), which are frames of the UL communication, to the communication device 112, by using the determined wireless resource.

In step S121, the communication device 112 performs frame detection at all times, and detects the UL frames (1 to n) being transmitted from the user terminal 111.

In a case where a same frame specification request supplied from an upper layer is received, the communication device 112 performs the processing in and after step S122.

In step S122, the communication device 112 specifies the same frame from the frames detected in step S121, as the same frame specification processing.

In step S123, the communication device 112 synthesizes and demodulates the specified same frame, as frame synthesis/demodulation processing.

In step S124, the communication device 112 determines the wireless resource to be used for the DL communication, on the basis of the wireless resource estimated to have been used in the UL communication from a detection/demodulation result of a UL frame.

Note that, hereinafter, individual pieces of the processing in steps S122 to S124 will be collectively referred to as frame reception processing.

In step S125, the communication device 112 repeatedly transmits DL frames (1 to n), which are frames of the DL communication, to the user terminal 111 by using the determined wireless resource.

Whereas, after transmitting the UL frame, in step S103, the user terminal 111 determines the wireless resource to be used for the DL communication, on the basis of the wireless resource used for the UL communication.

In step S104, the user terminal 111 performs frame detection only at a time when the DL frame is transmitted, by using the determined wireless resource.

In step S105, the user terminal 111 synthesizes and demodulates the detected frame.

Note that determining the wireless resource to be used for the DL communication on the basis of the wireless resource used for the UL communication specifically means to determine a hopping pattern to be used for the DL communication and a start time of repetitive transmission. For example, in the wireless communication system 101, rules as shown in the following Equations (1) and (2) are defined and shared.

[Formula 1]

PATTERN NUMBER TO BE USED FOR DL COMMUNICATION=(PATTERN NUMBER USED FOR UL COMMUNICATION+Δp) mod NUMBER OF PATTERNS+1 (1)

Here, for example, ΔP=2 is used.

[Formula 2]

DL REPETITIVE TRANSMISSION START TIME=UL REPETITIVE TRANSMISSION START TIME+Δt (2)

By doing this way, the user terminal 111 can perform frame detection only at a time when the DL frame is transmitted. As a result, power saving can be achieved.

<Operation of User Terminal>

Figure 19:
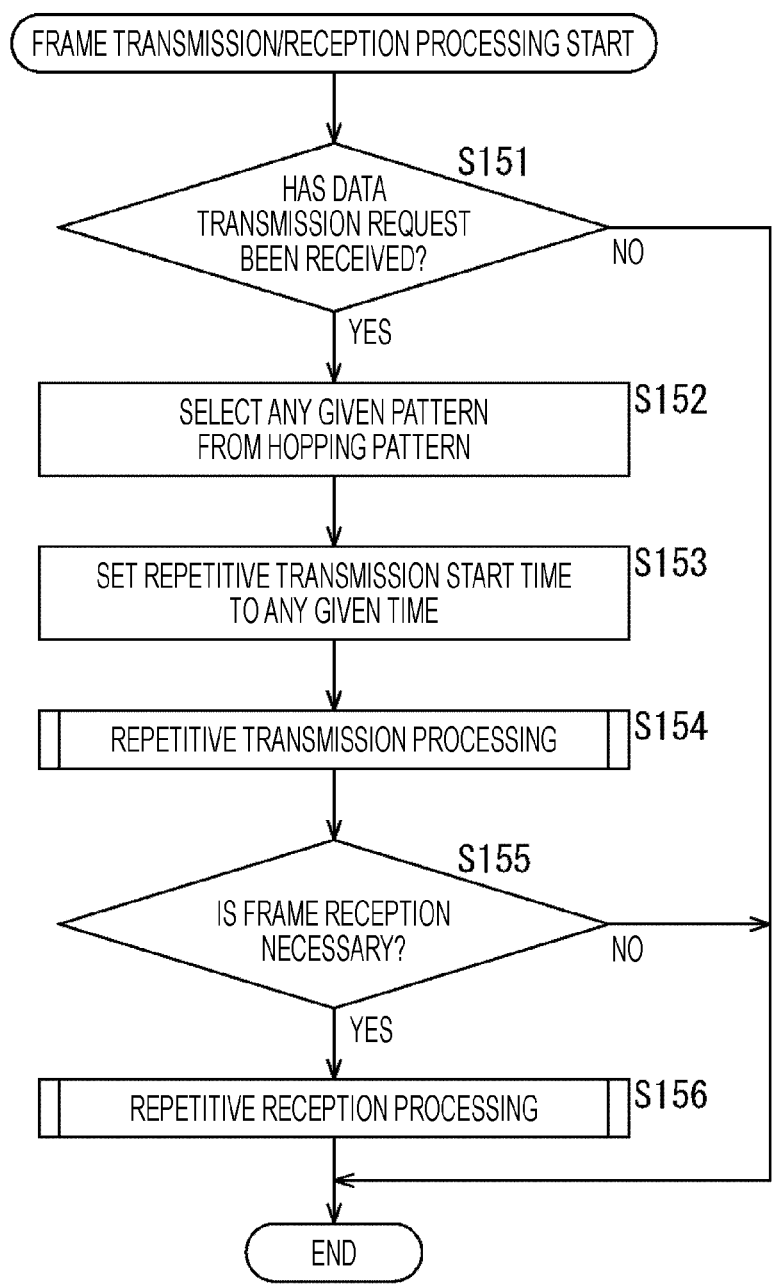
FIG. 19 is a flowchart for explaining frame transmission/reception processing of the user terminal.

FIG. 19 is a flowchart for explaining frame transmission/reception processing of the user terminal 111.

In step S151, the wireless control unit 122 determines whether or not a data transmission request has been received from an application of an upper layer (not illustrated). In a case where it is determined in step S151 that the data transmission request has been received, the process proceeds to step S152.

In step S152, the wireless resource determination unit 125 selects any given pattern from a hopping pattern in the storage unit 126 (corresponding to step S101 in FIG. 18). A pattern of a frequency and a pattern of a time are outputted to the wireless control unit 122. A pattern of a code is outputted to the frame generation unit 123.

In step S153, the wireless control unit 122 sets a repetitive transmission start time to any given time.

In step S154, the wireless control unit 122 executes repetitive transmission processing (corresponding to step S102 in FIG. 18). This repetitive transmission processing will be described later with reference to FIG. 20. By the processing in step S154, the same frame is repeatedly transmitted a predetermined number of times.

In step S155, the wireless control unit 122 determines whether or not frame reception is necessary. In a case where it is determined that frame reception is necessary, the process proceeds to step S156.

In step S156, the wireless control unit 122 executes repetitive reception processing (corresponding to steps S103 to S105 in FIG. 18). This repetitive reception processing will be described later with reference to FIGS. 21 and 22. By the processing in step S156, the same frame transmitted from the communication device 112 is repeatedly received a predetermined number of times.

After the frame is repeatedly received in step S156, the frame transmission/reception processing of the user terminal 111 ends.

Furthermore, similarly, also in a case where it is determined in step S151 that the data transmission request has not been received, or in a case where it is determined in step S155 that frame reception is not necessary, the frame transmission/reception processing ends.

Figure 20:
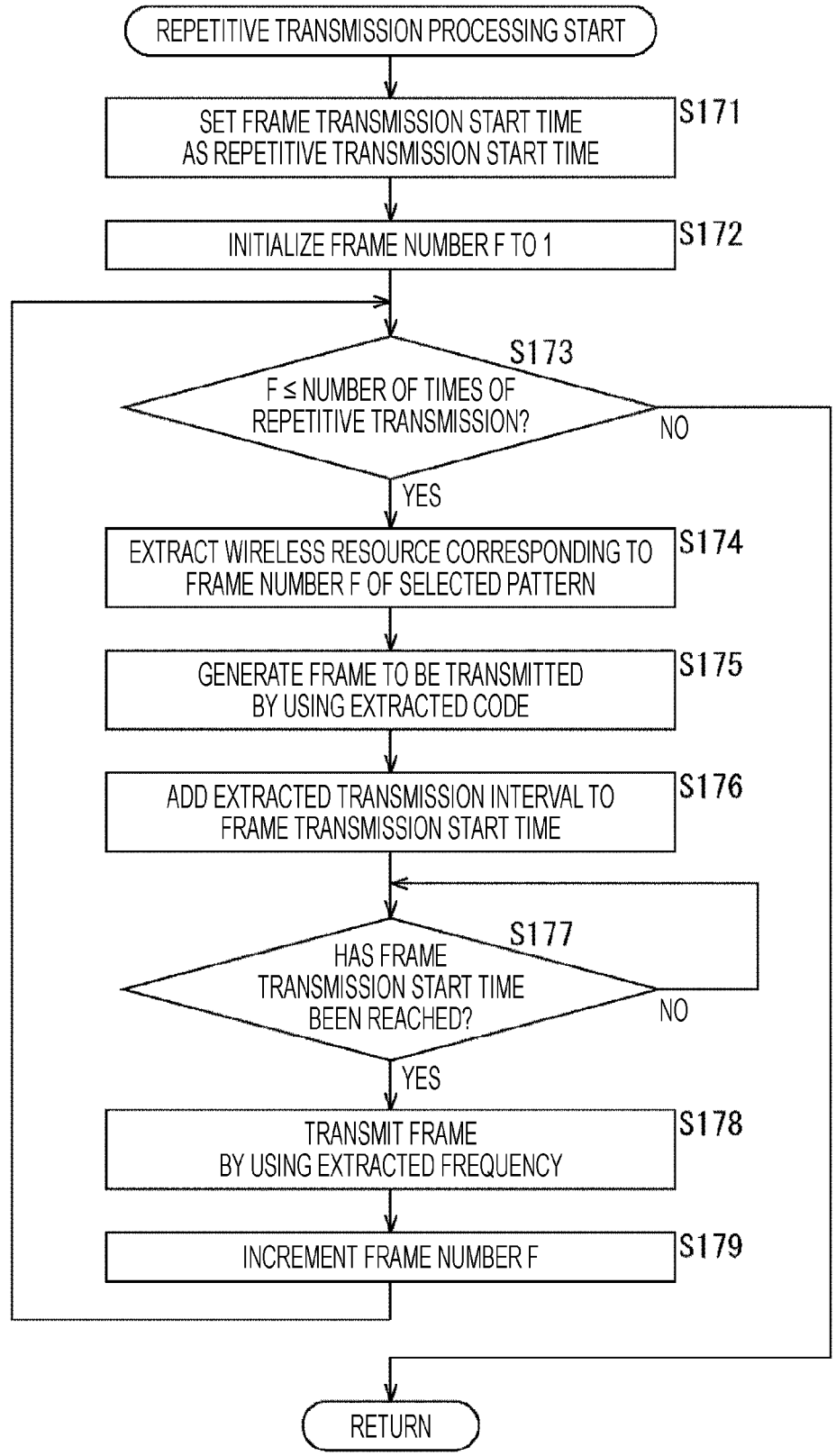
FIG. 20 is a flowchart for explaining repetitive transmission processing in step S154 in FIG. 19.

FIG. 20 is a flowchart for explaining the repetitive transmission processing in step S154 in FIG. 19.

In step S171, the wireless control unit 122 sets a frame transmission start time as a repetitive transmission start time.

In step S172, the wireless control unit 122 initializes a frame number F to 1.

In step S173, the wireless control unit 122 determines whether or not the frame number F is equal to or less than the number of times of repetitive transmission. In a case where it is determined in step S173 that the frame number F is equal to or less than the number of times of repetitive transmission, the process proceeds to step S174.

In step S174, the wireless control unit 122 and the frame generation unit 123 extract a wireless resource (a frequency, a time, and a code) corresponding to the frame number F of the pattern selected by the wireless resource determination unit 125.

In step S175, the frame generation unit 123 generates a frame to be transmitted, by using the extracted code.

In step S176, the wireless control unit 122 adds the extracted time (transmission interval) to the frame transmission start time.

In step S177, the wireless control unit 122 waits until the frame transmission start time is reached. In a case where it is determined in step S177 that the frame transmission start time has been reached, the process proceeds to step S178.

In step S178, the wireless control unit 122 controls the wireless communication unit 121 to transmit the frame supplied from the frame generation unit 123, by using the extracted frequency.

In step S179, the wireless control unit 122 increments the frame number F, and thereafter, the process returns to step S173.

In a case where it is determined in step S173 that the frame number F is larger than the number of times of repetitive transmission, the repetitive transmission processing ends.

Figure 21:
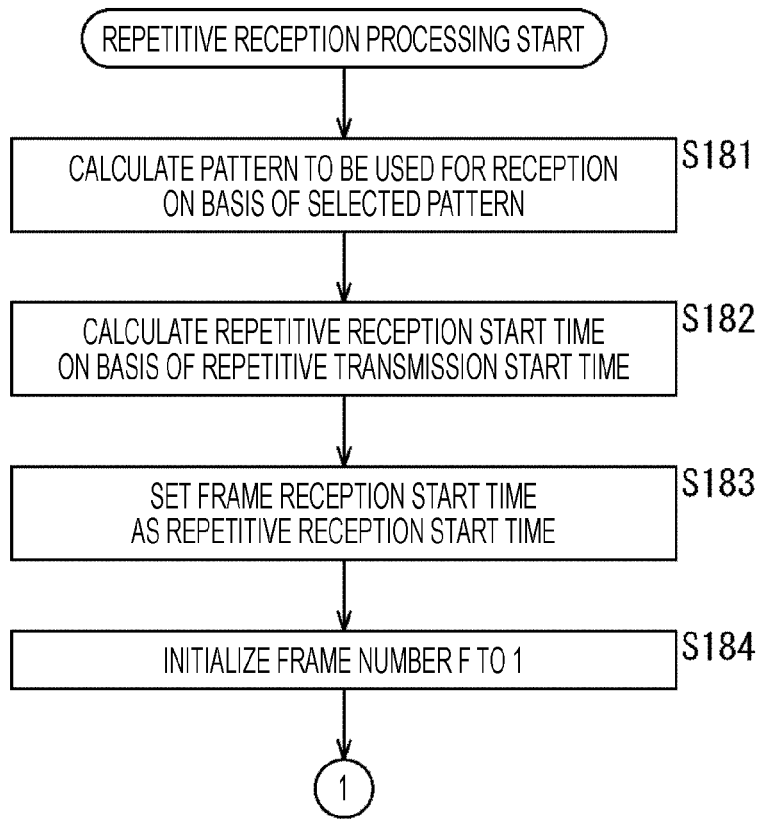
FIG. 21 is a flowchart for explaining repetitive reception processing in step S156 in FIG. 19.
Figure 22:
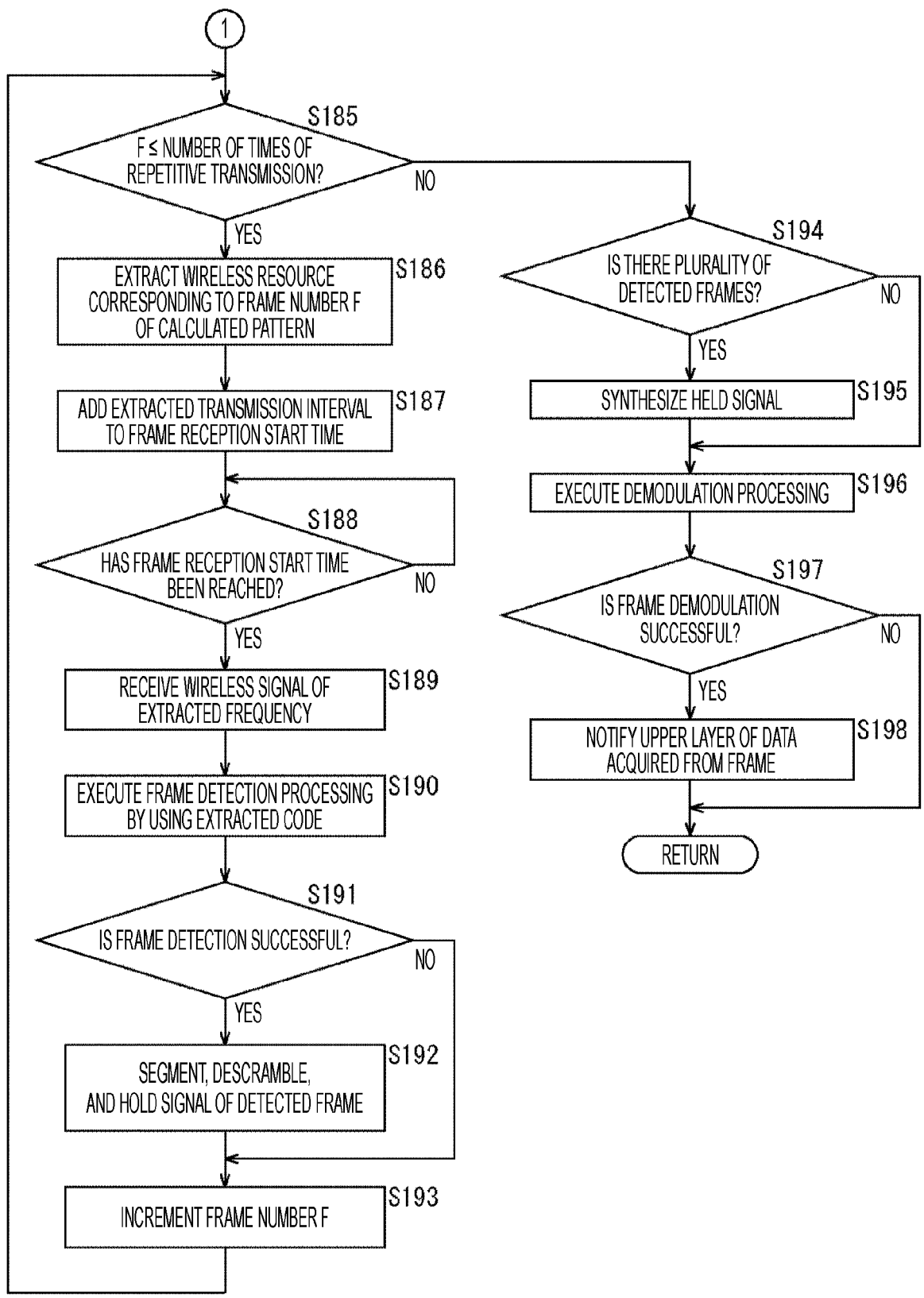
FIG. 22 is a flowchart for explaining the repetitive reception processing in step S156 in FIG. 19 subsequent to FIG. 21.

FIGS. 21 and 22 are flowcharts for explaining the repetitive reception processing in step S156 in FIG. 19.

In step S181 of FIG. 21, the wireless resource determination unit 125 calculates a pattern to be used for reception (DL communication) on the basis of the pattern selected in step S152 of FIG. 19. For the calculation of the hopping pattern, Equation (1) or Equation (2) described above is used. A pattern of a frequency and a pattern of a time are outputted to the wireless control unit 122. A pattern of a code is outputted to the frame generation unit 123.

In step S182, the wireless control unit 122 calculates a repetitive reception start time on the basis of a repetitive transmission start time.

In step S183, the wireless control unit 122 sets a frame reception start time as a repetitive reception start time.

In step S184, the wireless control unit 122 initializes the frame number F to 1.

In step S185 of FIG. 22, it is determined whether or not the frame number F is equal to or less than the number of times of repetitive transmission. In a case where it is determined in step S185 that the frame number F is equal to or less than the number of times of repetitive transmission, the process proceeds to step S186.

In step S186, the wireless control unit 122 and the frame generation unit 123 extract a wireless resource (a frequency, a time, and a code) corresponding to the frame number F of the pattern selected by the wireless resource determination unit 125.

In step S187, the wireless control unit 122 adds the time (transmission interval) extracted in step S186 to the frame reception start time.

In step S188, the wireless control unit 122 waits until the frame reception start time is reached. In a case where it is determined in step S188 that the frame reception start time has been reached, the process proceeds to step S189.

In step S189, the wireless communication unit 121 receives a wireless signal of the frequency extracted in step S186. The wireless communication unit 121 outputs the received wireless signal to the frame detection unit 127.

In step S190, the frame detection unit 127 executes frame detection processing by using the code extracted in step S186.

In step S191, the frame detection unit 127 determines whether or not the frame detection is successful. In a case where it is determined in step S191 that the frame detection is successful, the process proceeds to step S192.

In step S192, the frame detection unit 127 segments, descrambles, and holds a signal of the detected frame.

In a case where it is determined in step S191 that the frame detection is not successful, step S192 is skipped, and the process proceeds to step S193.

In step S193, the wireless control unit 122 increments the frame number F, and thereafter, the process returns to step S185.

In a case where it is determined in step S185 that the frame number F is larger than the number of times of repetitive transmission, the process proceeds to step S194.

In step S194, the frame detection unit 127 determines whether or not there is a plurality of detected frames. In a case where it is determined in step S194 that there is a plurality of detected frames, the process proceeds to step S195.

In step S195, the frame detection unit 127 synthesizes the signal held in step S192.

In a case where it is determined in step S194 that there is not a plurality of detected frames, step S195 is skipped, and the process proceeds to step S196.

In step S196, the frame demodulation unit 128 executes demodulation processing.

In step S197, the frame demodulation unit 128 determines whether or not the frame demodulation is successful. In a case where it is determined in step S197 that the frame demodulation is successful, the process proceeds to step S198.

In step S198, the frame demodulation unit 128 notifies an upper layer of data acquired from the frame.

In a case where it is determined in step S197 that frame demodulation has failed, the process skips step S198.

After the data is notified to the upper layer in step S198 or after step S198 is skipped, the repetitive reception processing ends.

<Operation of Communication Device>

As described above with reference to FIG. 18, processing of the communication device 12 is divided into three pieces: the frame detection processing (FIG. 23) in step S121, the frame reception processing (FIG. 24) in steps S122 to S124, and the repetitive transmission processing (FIG. 27) in step S125. These pieces of processing are individually executed in parallel. Hereinafter, each piece of processing will be described in detail.

Figure 23:
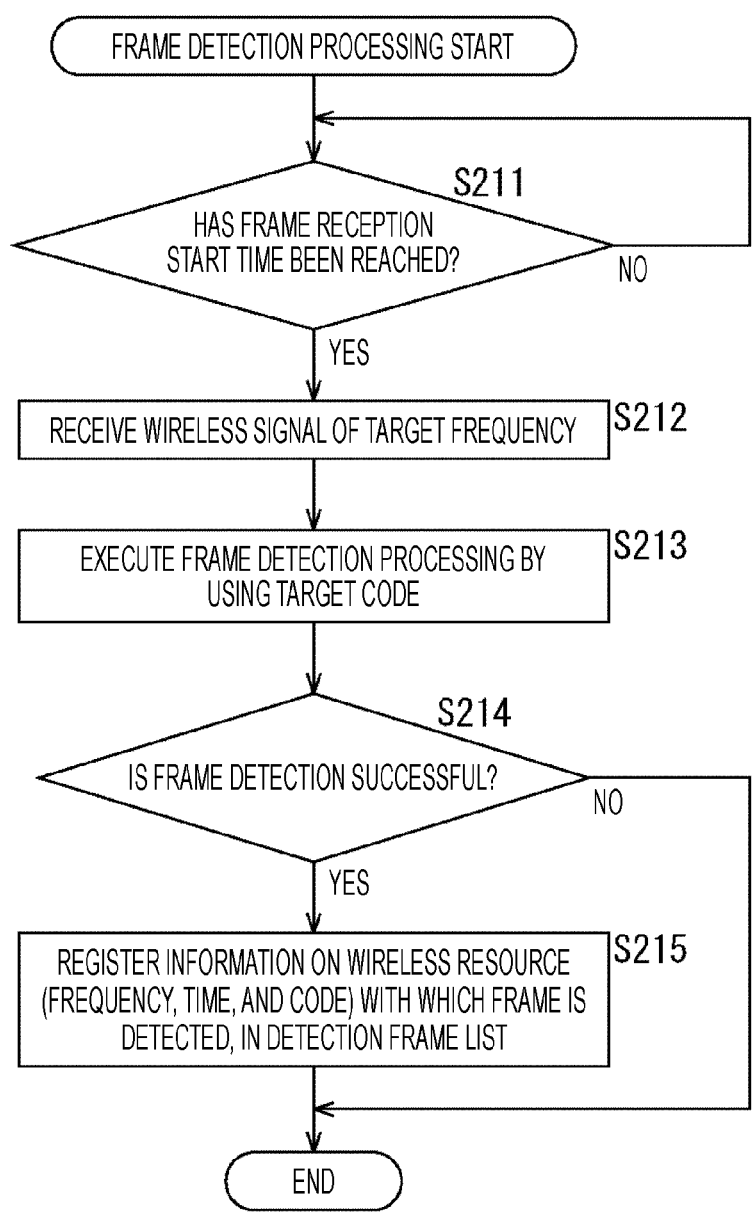
FIG. 23 is a flowchart for explaining frame detection processing of the communication device.

FIG. 23 is a flowchart for explaining the frame detection processing of the communication device 112. Note that the processing in FIG. 23 is processing corresponding to the frame detection processing in step S121 in FIG. 18.

In step S211, the wireless control unit 142 waits until it is determined that the frame reception start time has been reached. In a case where it is determined in step S211 that the frame reception start time has been reached, the process proceeds to step S212.

In step S212, the wireless communication unit 141 receives a wireless signal of a target frequency in accordance with a control signal supplied from the wireless control unit 142.

In step S213, the frame detection unit 146 executes the frame detection processing by using a target code.

In step S214, the frame detection unit 146 determines whether or not the frame detection is successful. In a case where it is determined in step S214 that the frame detection is successful, the process proceeds to step S215.

In step S215, the frame detection unit 146 registers information on a wireless resource (a frequency, a time, and a code) with which the frame is detected, in the detection frame list included in the same frame specification unit 147.

After the registration in the detection frame list in step S215 or in a case where it is determined in step S214 that the frame detection is not successful, the frame detection processing ends.

Note that the communication device 112 of the base station does not know which wireless resource is used by the user terminal 111 to transmit the frame, and thus the processing of FIG. 23 is repeatedly executed at all times. Furthermore, the processing of FIG. 23 needs to be executed in parallel by designating the target frequency and the target code such that the processing with all usable codes is performed on all usable frequencies.

Figure 24:
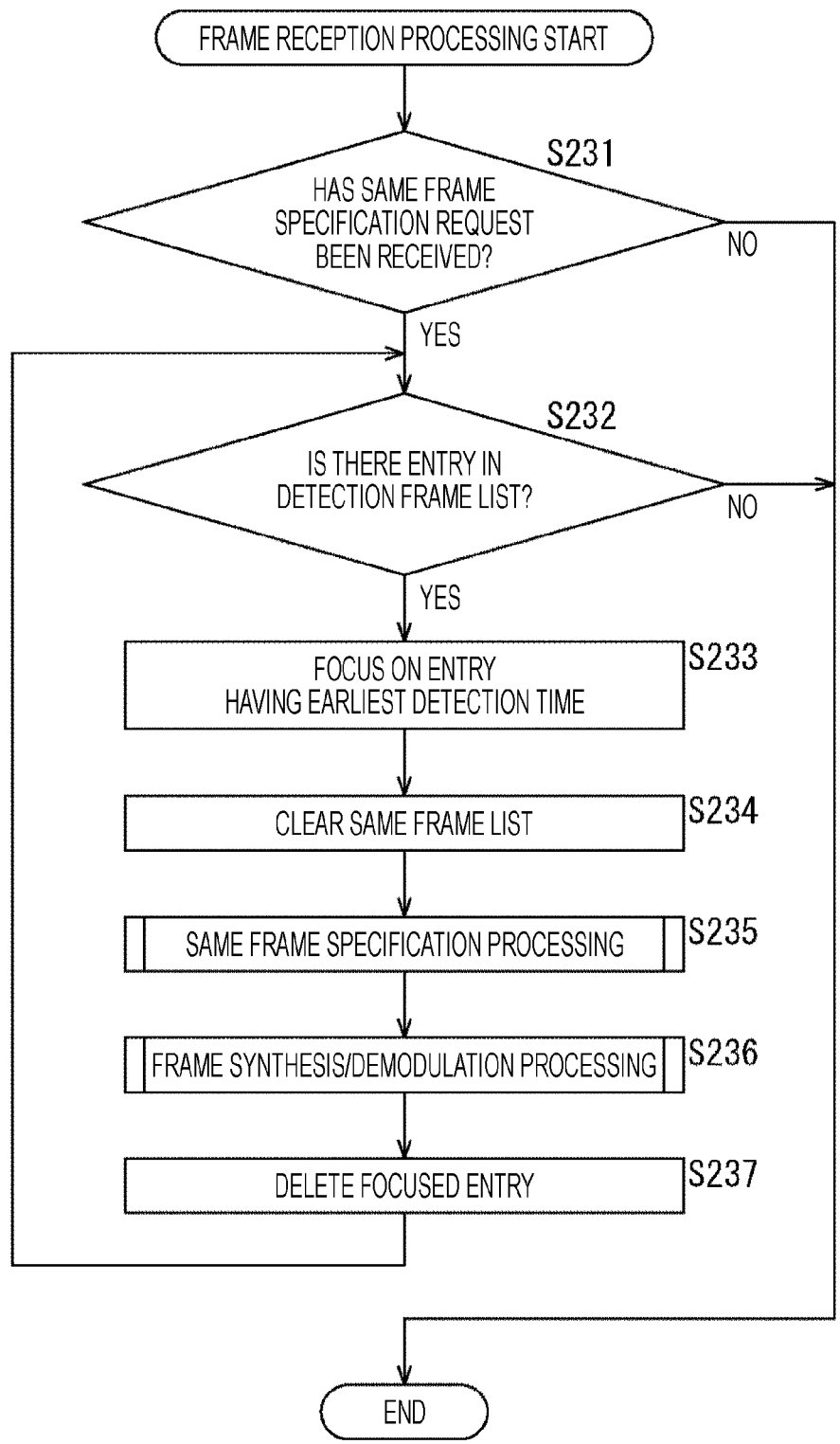
FIG. 24 is a flowchart for explaining frame reception processing of the communication device.

FIG. 24 is a flowchart for explaining frame reception processing of the communication device 112.

In step S231, the same frame specification unit 147 determines whether or not a same frame specification request has been received. For example, in a case where the same frame specification request is supplied from an upper layer of the communication device 112, it is determined in step S231 that the same frame specification request has been received, and the process proceeds to step S232.

In step S232, the same frame specification unit 147 determines whether or not there is an entry in the detection frame list. In a case where it is determined in step S232 that there is an entry in the detection frame list, the process proceeds to step S233.

In step S233, the same frame specification unit 147 focuses on an entry having the earliest detection time.

In step S234, the same frame specification unit 147 temporarily clears the same frame list included in the frame demodulation unit 148.

In step S235, the same frame specification unit 147 executes the same frame specification processing (corresponding to step S122 in FIG. 18). This same frame specification processing will be described later with reference to FIG. 25. By the processing in step S235, the same frame is specified.

In step S236, the frame demodulation unit 148 executes the frame synthesis/demodulation processing (corresponding to steps S123 and S124 in FIG. 18). The frame synthesis/demodulation processing will be described later with reference to FIG. 26. By the processing in step S236, the same frame is synthesized, and frame demodulation processing is performed.

In step S237, the same frame specification unit 147 deletes the focused entry.

After step S237, the process returns to step S232, and the subsequent processing is repeated.

In a case where it is determined in step S231 that the same frame specification request has not been received, or in a case where it is determined in step S232 that there is no entry in the detection frame list, the frame reception processing ends.

Note that, depending on a timing at which the same frame specification request has been received, the user terminal 111 may still be in the middle of repetitive transmission for the focused entry (detected frame). In this case, as in this processing, if an entry focused once is immediately deleted from the detection frame list, the number of frames determined to be the same frame decreases, and the gain obtained by the synthesis may decrease.

Therefore, in consideration of such a case, whether or not to delete the focused entry may be determined by using the number of frames specified as the same frame, whether demodulation is successful, a detection time of the focused entry, or the like.

Figure 25:
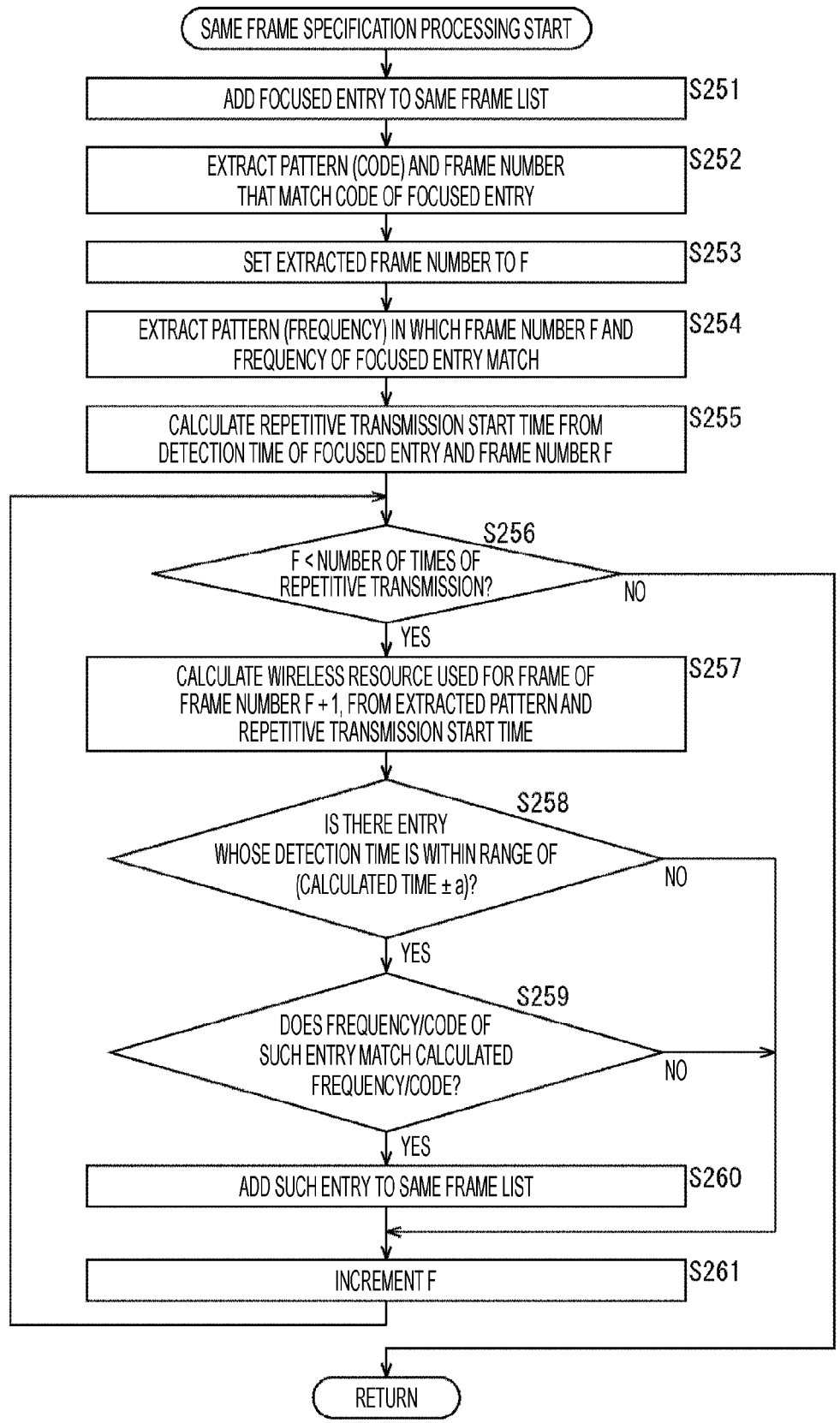
FIG. 25 is a flowchart for explaining same frame specification processing in step S235 in FIG. 24.

FIG. 25 is a flowchart for explaining the same frame specification processing in step S235 in FIG. 24.

In step S251, the same frame specification unit 147 adds a focused entry to the same frame list.

In step S252, the same frame specification unit 147 extracts a pattern (code) and a frame number that match a code of the focused entry.

In step S253, the same frame specification unit 147 sets a frame number to F.

In step S254, the same frame specification unit 147 extracts a pattern (frequency) in which the frame number F and a frequency of the focused entry match.

In step S255, the same frame specification unit 147 calculates a repetitive transmission start time from the detection time of the focused entry and the frame number F.

In step S256, the same frame specification unit 147 determines whether or not F is smaller than the number of times of repetitive transmission. In a case where it is determined in step S256 that F is smaller than the number of times of repetitive transmission, the process proceeds to step S257.

In step S257, the same frame specification unit 147 calculates a wireless resource to be used for a frame of a frame number F+1, from the extracted pattern and the repetitive transmission start time.

In step S258, the same frame specification unit 147 determines whether or not there is an entry whose detection time is within a range of (calculated time±a) in the detection frame list. In a case where it is determined in step S258 that there is an entry whose detection time is within the range of (calculated time±a) in the detection frame list, the process proceeds to step S259.

In step S259, the same frame specification unit 147 determines whether or not the frequency/code of the entry matches the calculated frequency/code. In a case where it is determined in step S259 that the frequency/code of the entry matches the calculated frequency/code, the process proceeds to step S260.

In step S260, the same frame specification unit 147 adds the entry to the same frame list. After the entry is added, the process proceeds to step S261.

Furthermore, similarly, also in a case where it is determined in step S258 that there is no entry whose detection time is within the range of (calculated time±a) in the detection frame list, or in a case where it is determined in step S259 that the frequency/code of the entry does not match the calculated frequency/code, the process proceeds to step S261.

In step S261, the same frame specification unit 147 increments F. After F is incremented, the process returns to step S256, and the subsequent processing is repeated.

Whereas, in a case where it is determined in step S256 that F is larger than the number of times of repetitive transmission, the same frame specification processing ends.

Figure 26:
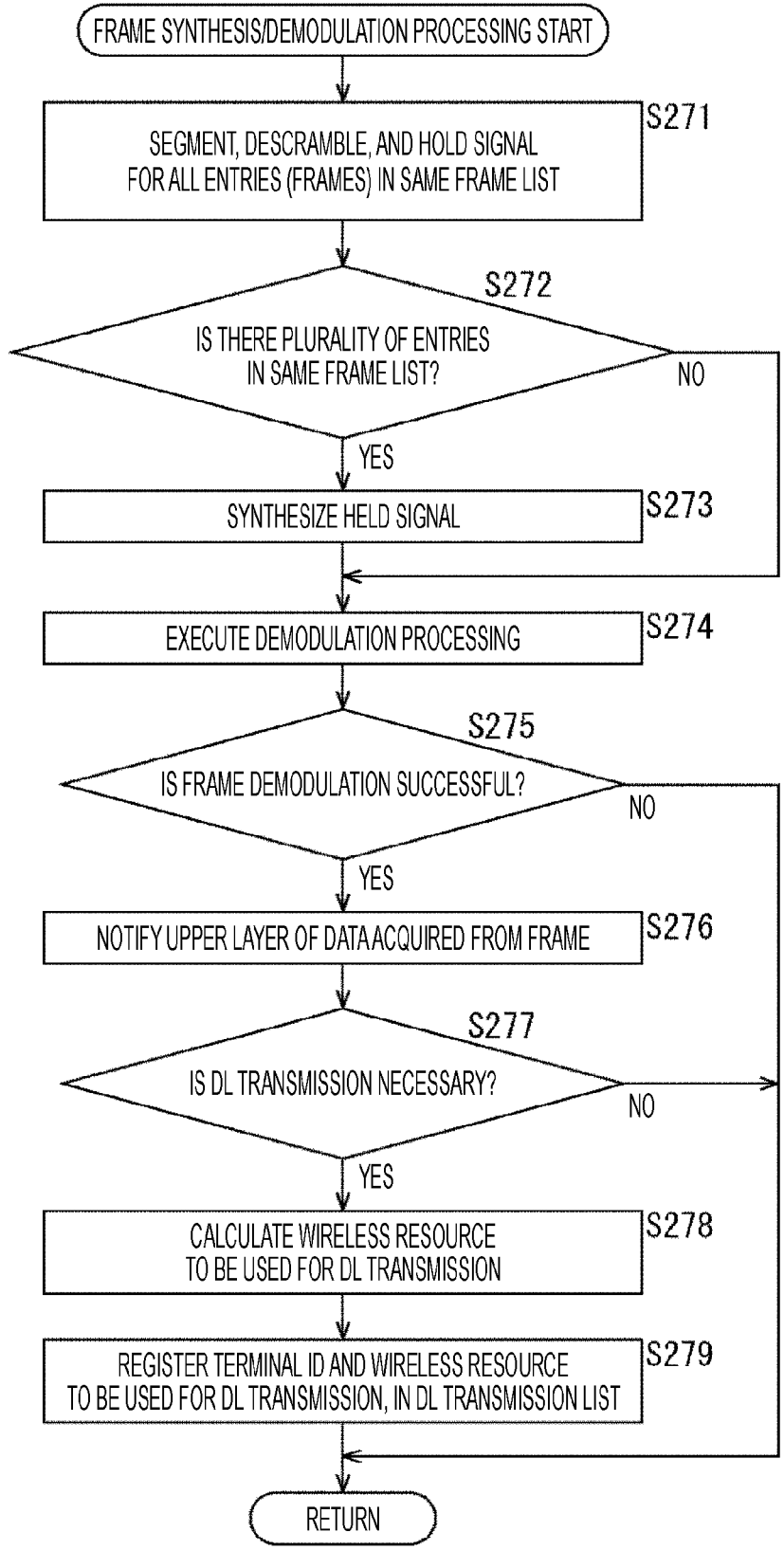
FIG. 26 is a flowchart for explaining frame synthesis/demodulation processing in step S236 in FIG. 24.

FIG. 26 is a flowchart for explaining the frame synthesis/demodulation processing in step S236 in FIG. 24.

In step S271, the frame demodulation unit 148 segments, descrambles, and holds a signal for all the entries (frames) in the same frame list.

In step S272, the frame demodulation unit 148 determines whether or not there is a plurality of entries in the same frame list. In a case where it is determined in step S272 that there is a plurality of entries in the same frame list, the process proceeds to step S273.

In step S273, the frame demodulation unit 148 synthesizes the held signal. After the synthesis of the signal, the process proceeds to step S274.

In a case where it is determined in step S272 that there is not a plurality of entries in the same frame list, step S273 is skipped, and the process proceeds to step S274.

In step S274, the frame demodulation unit 148 executes demodulation processing.

In step S275, the frame demodulation unit 148 determines whether or not the frame demodulation is successful. In a case where it is determined in step S275 that the frame demodulation is successful, the process proceeds to step S276.

In step S276, the frame demodulation unit 148 notifies the upper layer of data acquired from the frame.

In step S277, the wireless control unit 142 determines whether or not DL transmission is necessary. In a case where it is determined in step S277 that DL transmission is necessary, the process proceeds to step S278. At this time, the frame demodulation unit 148 outputs a wireless resource of the specified same frame to the wireless resource determination unit 144, as the wireless resource of the UL communication.

In step S278, the wireless resource determination unit 144 calculates a wireless resource to be used for the DL transmission.

In step S279, the wireless resource determination unit 144 registers the terminal ID and the wireless resource that is to be used for the DL transmission, in the DL transmission list. After the wireless resource is registered, the frame synthesis/demodulation processing ends.

Furthermore, similarly, also in a case where it is determined in step S275 that the demodulation of the frame is not successful, or in a case where it is determined in step S277 that DL transmission is not necessary, the frame synthesis/demodulation processing ends.

Figure 27:
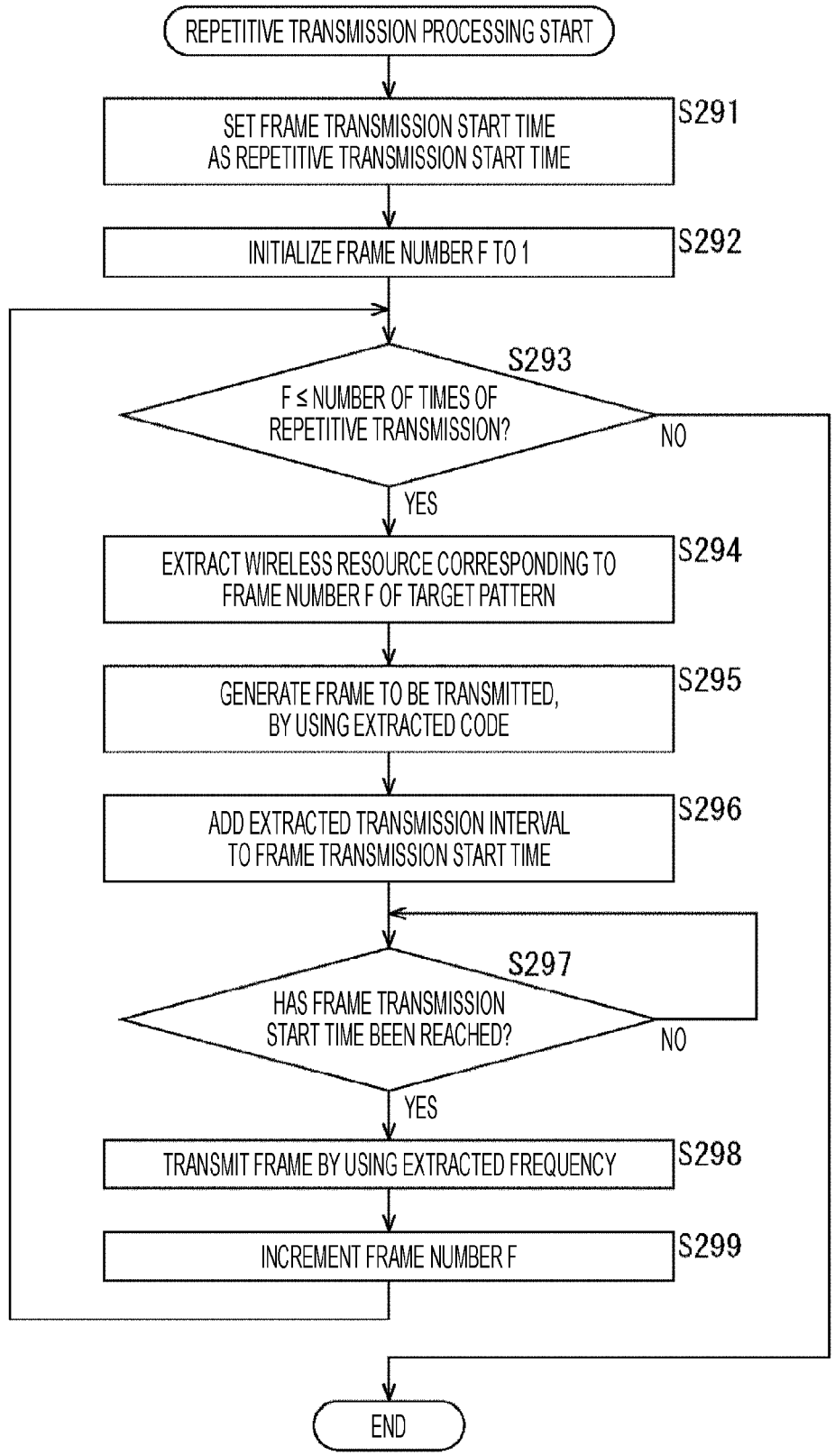
FIG. 27 is a flowchart for explaining repetitive transmission processing of the communication device.

FIG. 27 is a flowchart for explaining the repetitive transmission processing of the communication device 112.

This repetitive transmission processing is processing corresponding to step S125 in FIG. 18, and is processing performed for each entry of the DL transmission list by the communication device 112.

In step S291, the wireless control unit 142 sets a frame transmission start time as a repetitive transmission start time.

In step S292, the wireless control unit 142 initializes the frame number F to 1.

In step S293, the wireless control unit 142 determines whether or not the frame number F is equal to or less than the number of times of repetitive transmission. In a case where it is determined in step S293 that the frame number F is equal to or less than the number of times of repetitive transmission, the process proceeds to step S294.

In step S294, the wireless control unit 142 extracts a wireless resource (a frequency, a time, and a code) corresponding to the frame number F of the pattern of the focused entry.

In step S295, the frame generation unit 143 generates a frame to be transmitted, by using the extracted code.

In step S296, the wireless control unit 142 adds the extracted time (transmission interval) to the frame transmission start time.

In step S297, the wireless control unit 142 waits until the frame transmission start time is reached. In a case where it is determined in step S297 that the frame transmission start time has been reached, the process proceeds to step S298.

In step S298, the wireless control unit 142 controls the wireless communication unit 141 to transmit the frame by using the extracted frequency.

In step S299, the wireless control unit 142 increments the frame number F, and thereafter, the process returns to step S293.

In a case where it is determined in step S293 that the frame number F is larger than the number of times of repetitive transmission, the repetitive transmission processing ends.

As described above, in the third embodiment, there is used a code hopping pattern that is limited such that the frame number for repetitive transmission is uniquely determined on the basis of the code. As a result, since the reception side uniquely determines what number of frames a detected frame is, it is possible to correctly specify a same frame only by performing pattern matching once for the focused frame.

4. Fourth Embodiment (Example of Specifying Frame Number on Basis of Frequency)

As described above in the third embodiment, in a case of enabling determination as to what number of frames a detection frame is on the basis of a code, the code corresponding to the number of times of repetitive transmission x the number of patterns is required. Since the communication device 112 of the base station does not know which wireless resource is used by the user terminal 111 to transmit the frame, it is necessary to execute the frame detection processing in parallel so as to be performed at all times for all usable frequencies with all usable codes.

Therefore, when the number of codes to be used in the wireless communication system 101 increases, a processing amount for the frame detection processing of the communication device 112 increases.

Therefore, a fourth embodiment makes it makes possible to determine what number of frames a detected frame is on the basis of a frequency in a wireless resource.

A configuration of a wireless communication system 101, a configuration of a user terminal 111, and a configuration of a communication device 112 of the fourth embodiment are similar configurations to those of the third embodiment. Description overlapping with the description of the third embodiment described above will be appropriately omitted.

<Example of Hopping Pattern>

Next, a hopping pattern to be used for generating a wireless resource will be described. Also in the wireless communication system 101 of the fourth embodiment, a hopping pattern is defined for each of a frequency, a time, and a code.

<Time Hopping Pattern>

FIG. 28 is a table illustrating an example of a time hopping pattern.

The time hopping pattern indicates a transmission interval of each frame to be repeatedly transmitted. Also in a case of the fourth embodiment, similarly to the third embodiment, the number of patterns is limited to one. A value of the transmission interval is not particularly limited.

In a case of FIG. 28, the time hopping pattern includes one pattern. In a case where the pattern of pattern number 1 is selected, transmission interval 0, transmission interval $T_1$, transmission interval $T_1$, and transmission interval $T_1$ are used to transmit frames of frame numbers 1 to 4, respectively.

<Frequency Hopping Pattern>

FIG. 29 is a table illustrating an example of a frequency hopping pattern.

The frequency hopping pattern indicates a frequency to be used for each frame to be repeatedly transmitted. In a case of the fourth embodiment, it is necessary to limit such that a frame number for repetitive transmission is uniquely determined on the basis of a frequency. Therefore, the number of the frequency hopping patterns is to be an integer obtained by dividing the number of usable frequencies by the number of times of repetitive transmission.

In a case of the example of FIG. 29, in a case where there are nine usable frequencies and the number of times of repetitive transmissions is four, the definable frequency hopping pattern is to be two patterns.

In a case where a pattern of pattern number 1 is selected, frequencies $f_0$, $f_5$, $f_7$, and $f_0$ are used to transmit frames of frame numbers 1 to 4, respectively. In a case where the pattern of pattern number 2 is selected, frequencies $f_2$, $f_6$, $f_1$, and $f_3$ are used to transmit the frames of frame numbers 1 to 4, respectively.

<Hopping Pattern of Code>

FIG. 30 is a table illustrating an example of a code hopping pattern.

The code hopping pattern indicates a combination of initial values to be used for generating a preamble/SYNC and a scramble pattern to be used for generating each frame to be repeatedly transmitted. In the fourth embodiment, the code is fixed, but is not limited to the example of FIG. 30.

In a case of FIG. 30, the code hopping pattern includes one pattern. In a case where a pattern of pattern number 1 is selected, codes $C_1$, $C_1$, $C_1$, and $C_1$ are used to transmit frames of frame numbers 1 to 4, respectively.

Note that $V_1$, $V_2$, $V_3$, and $V_4$ are respectively used as values 1 to 4, for the code $C_1$.

Effects of Fourth Embodiment

Next, a description is given to an example in which the first frame in same frames has been unable to be detected correctly on the reception side, in a case of using a hopping pattern (FIGS. 28 to 30) limited such that the frame number for repetitive transmission is uniquely determined on the basis of the frequency.

FIG. 31 is a table illustrating a detection frame list in the communication device 112.

In the detection frame list of FIG. 31, wireless resources of detected frames of entries 1 to 7 are registered.

As entry 1, information on a wireless resource whose time is T'+$T_1$, frequency is $f_5$, and code is $C_1$ is registered. As entry 2, information on a wireless resource whose time is T'+$2T_1$, frequency is $f_2$, and code is $C_1$ is registered. As entry 3, information on a wireless resource whose time is T'+$2T_1$, frequency is $f_7$, and code is $C_1$ is registered. As entry 4, information on a wireless resource whose time is T'+$3T_1$, frequency is $f_0$, and code is $C_1$ is registered.

As entry 5, information on a wireless resource whose time is T'+$3T_1$, frequency is $f_6$, and code is $C_1$ is registered. As entry 6, information on a wireless resource whose time is T'+$4T_1$, frequency is $f_1$, and code is $C_1$ is registered. As entry 7, information on a wireless resource whose time is T'+$5T_1$, frequency is $f_3$, and code is $C_1$ is registered.

Figure 32:
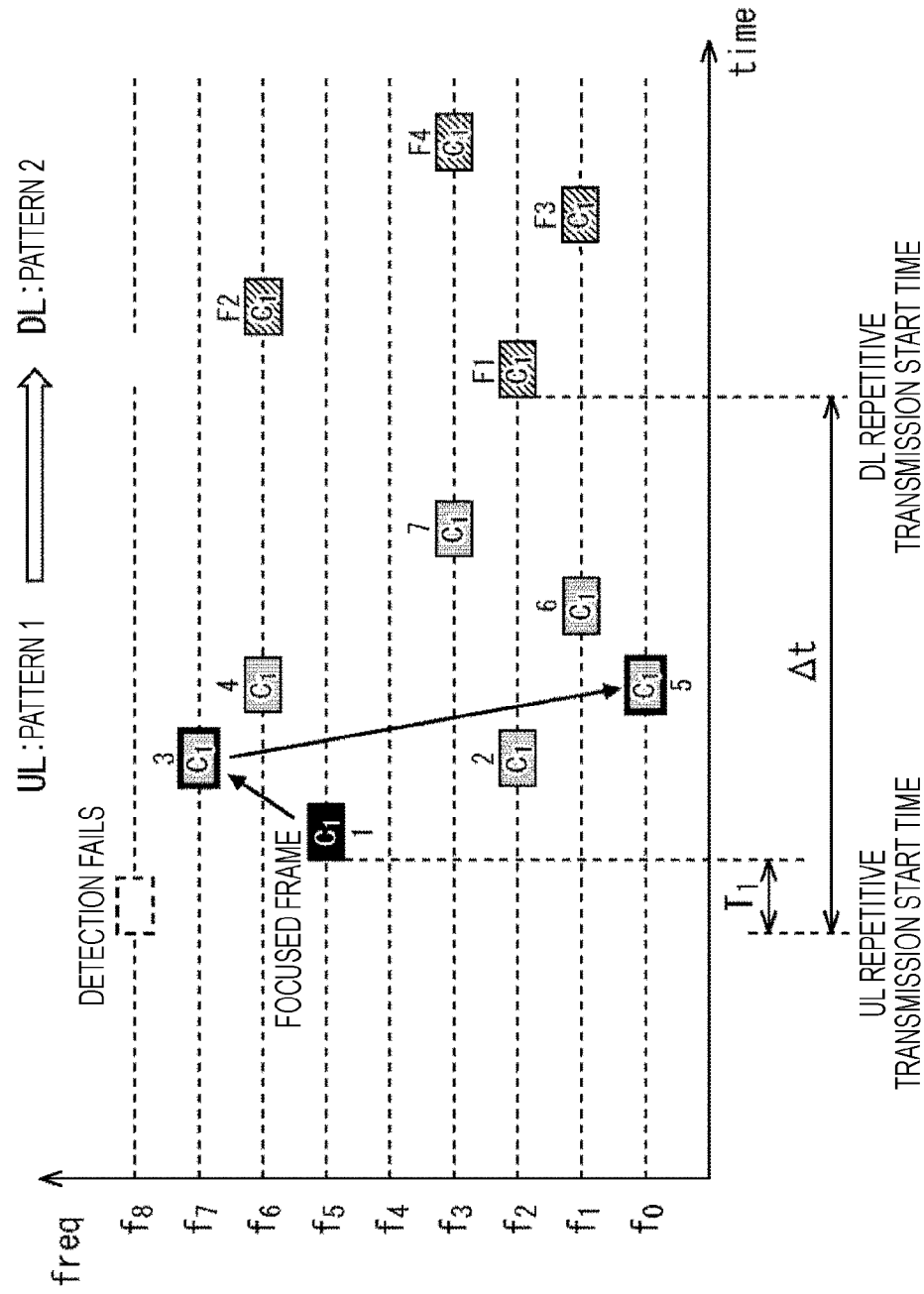
FIG. 32 is a view illustrating an example in which DL transmission is performed after a same frame is specified from detected frames.

FIG. 32 is a view illustrating a state in which the communication device 12 performs DL transmission after specifying a same frame from detected frames.

In FIG. 32, the frames of entries 1 to 7 registered in the detection frame list of FIG. 31 are assigned with entry numbers, and are shown at positions of respectively corresponding frequencies in order of detection time. Furthermore, on the right side of the DL repetitive transmission start time, frames F1 to F4 to be subjected to the DL transmission are indicated in order of respective transmission times at respective frequencies. Moreover, the frames of entries 1 to 7 and frames F1 to F4 to be subjected to the DL transmission also indicate the respective codes.

As illustrated in FIG. 32, in a case where the same frame specification processing is performed with entry 1 of the detection frame list as the focused entry, the detected frequency is ($f_5$). Therefore, on the basis of the frequency hopping pattern (FIG. 29), it is specified that the frequency of the focused frame is the frequency of frame number 2, and the pattern number is 1.

Furthermore, on the basis of the code ($C_1$) with which the frame of the focused entry has been detected and the code of frame number 2 of the code hopping pattern (FIG. 30), the pattern used for repetitive transmission can be correctly extracted as pattern number 1.

Moreover, on the basis of a time (T'+$T_1$) at which the focused entry has been detected and a total transmission interval up to the second frame of the time hopping pattern, a start time (T') of repetitive transmission as the UL communication is correctly calculated.

Here, in the wireless communication system 1, in order to determine a wireless resource to be used for the DL communication, Equations (1) and (2) described above are shared by the user terminal 111 and the communication device 112. For example, in a case of ΔP=2, the user terminal 111 and the communication device 112 individually calculate pattern number 2 ($f_2$, $f_6$, $f_1$, and $f_3$) (FIG. 29) to be used for repetitive transmission of the DL communication illustrated in FIG. 32, by Equation (1) and the frequency hopping pattern (FIG. 29). Furthermore, the user terminal 111 and the communication device 112 individually calculate a start time (T'+Δt) of the repetitive transmission of the DL communication by Equation (2). In this way, since the wireless resource calculated by the user terminal 111 and to be used for the DL communication matches the wireless resource calculated by the communication device 112 and to be used for the DL communication, the user terminal 111 can receive a DL frame.

In this way, in the fourth embodiment of the present technology, there is used a frequency hopping pattern that is limited such that the frame number for repetitive transmission is uniquely determined on the basis of the frequency. As a result, since the reception side uniquely determines what number of frames a detected frame is, it is possible to correctly specify a same frame only by performing pattern matching once for the focused frame.

Note that, in the fourth embodiment, processing of the entire wireless communication system 101 is similar to the processing described above with reference to FIG. 18. The processing of the user terminal 111 is also similar to the processing described above in the third embodiment. In the processing of the communication device 112, processing other than the following same frame specification processing is similar to the processing described above in the third embodiment.

Therefore, in the processing in the fourth embodiment, description of processing similar to the processing described above in the third embodiment will be redundant, and thus to be omitted.

<Operation of Communication Device>

Figure 33:
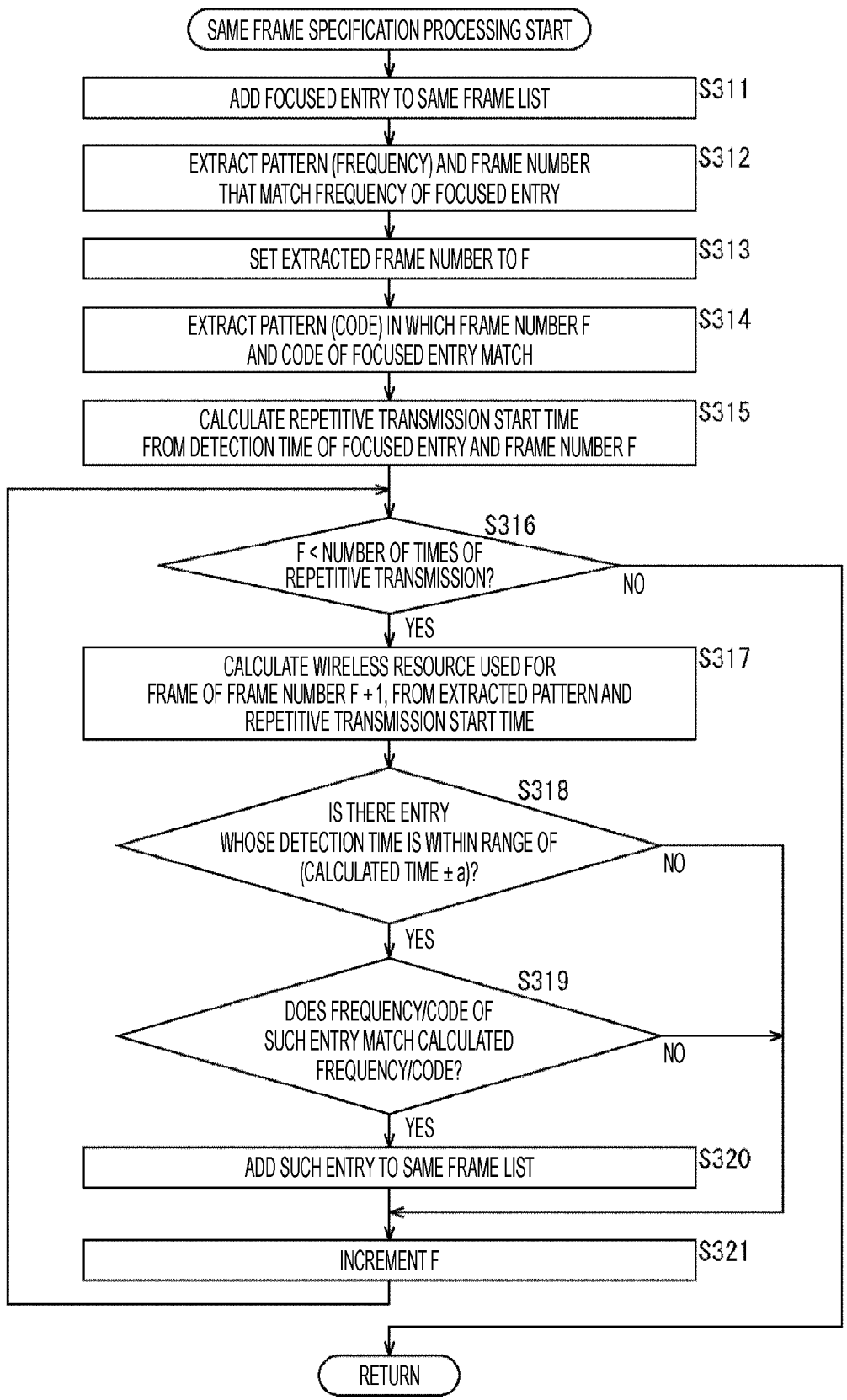
FIG. 33 is a flowchart for explaining another example of the same frame specification processing in step S235 in FIG. 24.

FIG. 33 is a flowchart for explaining another example of the same frame specification processing in step S235 in FIG. 24.

In step S311, the same frame specification unit 147 adds a focused entry to a same frame list.

In step S312, the same frame specification unit 147 extracts a pattern (frequency) and a frame number that match a frequency of the focused entry.

In step S313, the same frame specification unit 147 sets a frame number to F.

In step S314, the same frame specification unit 147 extracts a pattern (code) in which the frame number F and a code of the focused entry match.

Note that, since processing in steps S315 to S321 in FIG. 33 is similar to processing in steps S255 to S261 in FIG. 25, the description thereof will be omitted.

As described above, in the fourth embodiment of the present technology, there is used a pattern of a frequency that is limited such that a frame number for repetitive transmission is uniquely determined on the basis of a frequency. As a result, since the reception side uniquely determines what number of frames a detected frame is, it is possible to correctly specify a same frame only by performing pattern matching once for the focused frame.

5. Fifth Embodiment (Example of Specifying Frame Number on Basis of Combination of Frequency and Code)

As described above in the fourth embodiment, in a case of enabling determination as to what number of frames a detection frame is on the basis of a frequency, the number of hopping patterns that can be defined is to be small with respect to usable frequencies. When the number of frequency hopping patterns is small, a collision of frames transmitted by the user terminal 111 is likely to occur in the wireless communication system 101.

Therefore, in a fifth embodiment, it makes possible to determine what number of frames a detected frame is on the basis of a combination of a frequency and a code in a wireless resource.

Since a configuration of a wireless communication system 101, a configuration of a user terminal 111, and a configuration of a communication device 112 of the fifth embodiment are similar configurations to those of the third embodiment, description overlapping with the description of the third embodiment described above will be appropriately omitted.

<Example of Hopping Pattern>

Next, a hopping pattern to be used for generating a wireless resource will be described. Also in the wireless communication system 101 of the fifth embodiment, a hopping pattern is defined for each of a frequency, a time, and a code.

<Time Hopping Pattern>

FIG. 34 is a table illustrating an example of a time hopping pattern.

The time hopping pattern indicates a transmission interval of each frame to be repeatedly transmitted. Also in a case of the fifth embodiment, similarly to the third embodiment, the number of patterns is limited to one. A value of the transmission interval is not particularly limited.

In a case of FIG. 34, the time hopping pattern includes one pattern. In a case where the pattern of pattern number 1 is selected, transmission interval 0, transmission interval $T_1$, transmission interval $T_1$, and transmission interval $T_1$ are used to transmit frames of frame numbers 1 to 4, respectively.

<Frequency Hopping Pattern>

FIG. 35 is a table illustrating an example of a frequency hopping pattern.

The frequency hopping pattern indicates a frequency to be used for each frame to be repeatedly transmitted. In a case of the fifth embodiment, it is necessary to limit such that the frame number for repetitive transmission is uniquely determined on the basis of a combination of a frequency and a code in FIG. 36 described later.

In a case of the example of FIG. 35, in a case where there are nine usable frequencies, the definable frequency hopping pattern is to be four patterns.

In a case where a pattern of pattern number 1 is selected, frequencies $f_8$, $f_5$, $f_7$, and $f_0$ are used to transmit frames of frame numbers 1 to 4, respectively. In a case where the pattern of pattern number 2 is selected, frequencies $f_2$, $f_6$, $f_1$, and $f_3$ are used to transmit the frames of frame numbers 1 to 4, respectively. In a case where the pattern of pattern number 3 is selected, frequencies $f_5$, $f_2$, $f_3$, and $f_7$ are used to transmit the frames of frame numbers 1 to 4, respectively. In a case where the pattern of pattern number 4 is selected, frequencies $f_6$, $f_8$, $f_0$, and $f_1$ are used to transmit the frames of frame numbers 1 to 4, respectively.

<Hopping Pattern of Code>

FIG. 36 is a table illustrating an example of a code hopping pattern.

In a case of FIG. 36, the code hopping pattern includes one pattern. In a case where a pattern of pattern number 1 is selected, codes $C_1$, $C_2$, $C_1$ and $C_2$ are used to transmit frames of frame numbers 1 to 4, respectively.

Note that, $V_1$, $V_2$, $V_3$, and $V_4$ are respectively used as Value 1 to Value 4, for the code $C_1$. $V_2$, $V_3$, $V_4$, and $V_1$ are respectively used as Value 1 to Value 4, for the code $C_2$.

Effects of Fifth Embodiment

Next, a description is given to an example in which the first frame in same frames has been unable to be detected correctly on the reception side, in a case of using a hopping pattern (FIGS. 34 to 36) limited such that the frame number for repetitive transmission is uniquely determined on the basis of the combination of the frequency and the code.

FIG. 37 is a table illustrating a detection frame list in the communication device 112.

In the detection frame list of FIG. 37, wireless resources of detected frames of entries 1 to 7 are registered.

As entry 1, information on a wireless resource whose time is $T'+T_1$, frequency is $f_5$, and code is $C_2$ is registered. As entry 2, information on a wireless resource whose time is $T'+2T_1$, frequency is $f_2$, and code is $C_1$ is registered. As entry 3, information on a wireless resource whose time is $T'+2T_1$, frequency is $f_7$, and code is $C_1$ is registered. As entry 4, information on a wireless resource whose time is $T'+3T_1$, frequency is $f_0$, and code is $C_2$ is registered.

As entry 5, information on a wireless resource whose time is $T'+3T_1$, frequency is $f_6$, and code is $C_2$ is registered. As entry 6, information on a wireless resource whose time is $T'+4T_1$, frequency is $f_1$, and code is $C_1$ is registered. As entry 7, information on a wireless resource whose time is $T'+5T_1$, frequency is $f_3$, and code is $C_2$ is registered.

Figure 38:
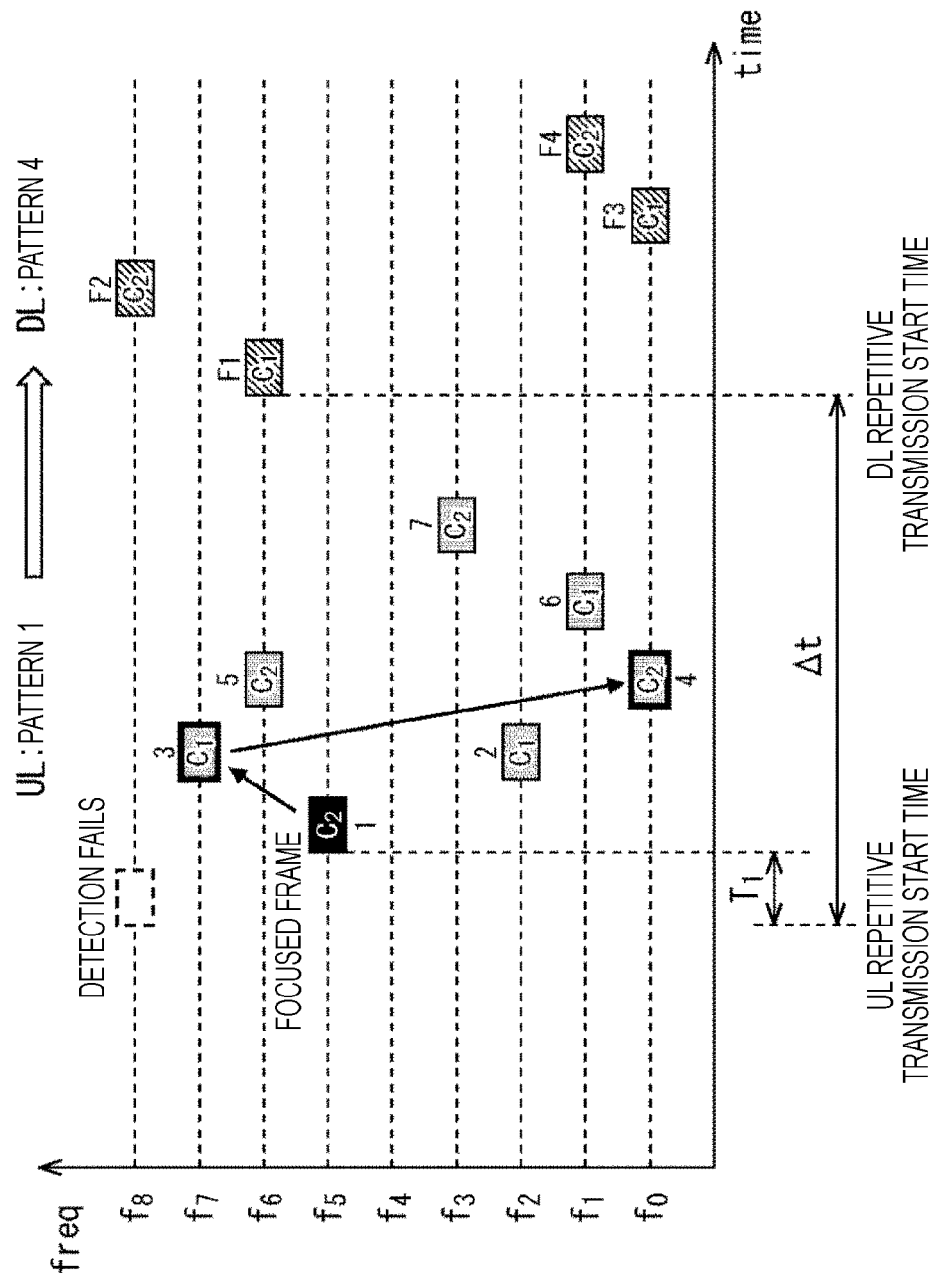
FIG. 38 is a view illustrating an example in which DL transmission is performed after a same frame is specified from detected frames.

FIG. 38 is a view illustrating a state in which the communication device 112 performs DL transmission after specifying a same frame from detected frames.

In FIG. 38, the frames of entries 1 to 7 registered in the detection frame list of FIG. 37 are assigned with entry numbers, and are shown at positions of respectively corresponding frequencies in order of detection time. Furthermore, on the right side of the DL repetitive transmission start time, frames F1 to F4 to be subjected to the DL transmission are indicated in order of respective transmission times at respective frequencies. Moreover, the frames of entries 1 to 7 and frames F1 to F4 to be subjected to the DL transmission also indicate the respective codes.

As illustrated in FIG. 38, in a case where the same frame specification processing is performed with entry 1 of the detection frame list as the focused entry, the detected code is ($C_2$). Therefore, it is specified that the frequency of the focused frame is the frequency of frame number 2 or the frequency of frame number 4 on the basis of the pattern of codes (FIG. 36).

Furthermore, on the basis of the frequency ($f_5$) at which the frame of the focused entry has been detected and the frequency of frame number 2 or the frequency of frame number 4 of the frequency hopping pattern (FIG. 35), a frame of the focused entry can be correctly extracted as the frame of frame number 2. Moreover, the pattern used for repetitive transmission can be correctly extracted as pattern number 1.

Moreover, on the basis of the time ($T'+T_1$) at which the focused entry has been detected and a total transmission interval up to the second frame of the time hopping pattern, a start time ($T'$) of repetitive transmission as the UL communication and a start time ($T'+\Delta t$) of repetitive transmission of the DL communication can also be calculated correctly.

Here, in the wireless communication system 1, in order to determine a wireless resource to be used for the DL communication, Equations (1) and (2) described above are shared by the user terminal 111 and the communication device 112. For example, in a case of ΔP=2, the user terminal 111 and the communication device 112 individually calculate pattern number 4 (f6, f8, f0, and f1) (FIG. 35) to be used for repetitive transmission of the DL communication illustrated in FIG. 38, by Equation (1) and the frequency hopping pattern (FIG. 35). Furthermore, the user terminal 111 and the communication device 112 individually calculate a start time ($T'+\Delta t$) of the repetitive transmission of the DL communication by Equation (2). Therefore, since the wireless resource calculated by the user terminal 111 and to be used for the DL communication coincides with the wireless resource calculated by the communication device 112 and to be used for the DL communication, the user terminal 111 can receive a DL frame.

In this way, in the fifth embodiment of the present technology, there are used a frequency hopping pattern and a code hopping pattern that are limited such that the frame number for repetitive transmission is uniquely determined on the basis of the combination of the frequency and the code. As a result, since the reception side uniquely determines what number of frames a detected frame is, it is possible to correctly specify a same frame only by performing pattern matching once for the focused frame.

Note that, in the fifth embodiment, processing of the entire wireless communication system 101 is similar to the processing described above with reference to FIG. 18. The processing of the user terminal 111 is also similar to the processing described above in the third embodiment. In the processing of the communication device 112, processing other than the following same frame specification processing is similar to the processing described above in the third embodiment.

Therefore, in the processing in the fifth embodiment, description of processing similar to the processing described above in the third embodiment will be redundant, and thus to be omitted.

<Operation of Communication Device>

Figure 39:
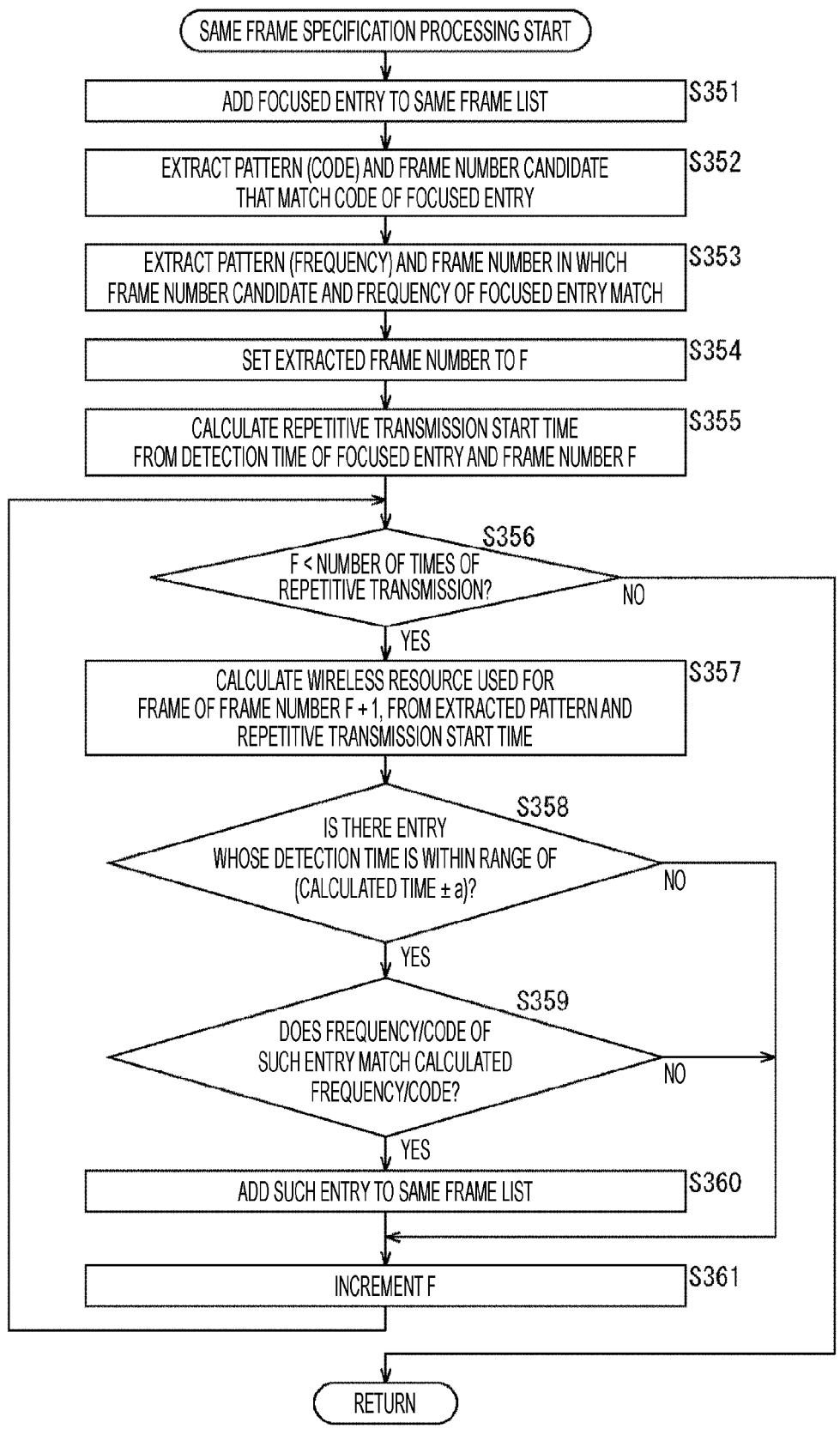
FIG. 39 is a flowchart for explaining another example of the same frame specification processing in step S235 in FIG. 24.

FIG. 39 is a flowchart for explaining another example of the same frame specification processing in step S235 in FIG. 24.

In step S351, the same frame specification unit 147 adds a focused entry to a same frame list.

In step S352, the same frame specification unit 147 extracts a pattern (code) and a frame number candidate that match a code of the focused entry.

In step S353, the same frame specification unit 147 extracts a pattern (frequency) and a frame number in which the frame number candidate and a frequency of the focused entry match.

In step S354, the same frame specification unit 147 sets a frame number to F.

Note that, since processing in steps S355 to S361 in FIG. 39 is similar to processing in steps S255 to S261 in FIG. 25, the description thereof will be omitted.

As described above, in the fifth embodiment of the present technology, there are used a frequency hopping pattern and a code hopping pattern that are limited such that the frame number for repetitive transmission is uniquely determined on the basis of a combination of a frequency and a code. As a result, since the reception side uniquely determines what number of frames a detected frame is, it is possible to correctly specify a same frame only by performing pattern matching once for the focused frame.

6. Other

Effects

In the present technology, a wireless resource to be used for repetitive transmission of a same frame is limited. As a result, even in a case where there is a frame that has been unable to be detected in the base station among repeatedly transmitted same frames, a frame number of the detected same frame can be uniquely determined.

According to the present technology, the same frame can be correctly specified.

According to the present technology, it is possible to suppress the time required for the same frame specification processing, as compared with a round robin method on wireless resources.

According to the present technology, it is possible to suppress the number of combinations determined to be the same frame and to suppress a processing amount required for the demodulation processing, as compared with a round robin method on wireless resources.

According to the present technology, it is possible to correctly specify a pattern with which the wireless resource used for the UL communication is determined. Further, the wireless resources individually calculated by the user terminal and the base station and to be used for the DL communication match each other, and the user terminal can receive a DL frame.

<Computer Configuration Example>

The series of processes described above can be executed by hardware or software. In a case of executing the series of processes by software, a program that forms the software is installed from a program recording medium to a computer incorporated in dedicated hardware, to a general-purpose personal computer, or the like.

FIG. 40 is a block diagram illustrating a configuration example of hardware of a computer that executes the series of processes described above in accordance with a program.

A CPU 301, a ROM 302, and a RAM 303 are connected to each other by a bus 304.

The bus 304 is further connected with an input/output interface 305. The input/output interface 305 is connected with an input unit 306 including a keyboard, a mouse, and the like, and an output unit 307 including a display, a speaker, and the like. Furthermore, the input/output interface 305 is connected with a storage unit 308 including a hard disk, a non-volatile memory, and the like, a communication unit 309 including a network interface and the like, and a drive 310 that drives a removable medium 311.

In the computer configured as described above, the series of processes described above are performed, for example, by the CPU 301 loading a program recorded in the storage unit 308 into the RAM 303 via the input/output interface 305 and the bus 304, and executing.

The program to be executed by the CPU 301 is provided, for example, by being recorded on the removable medium 311 or via wired or wireless transfer media such as a local area network, the Internet, and digital broadcasting, to be installed in the storage unit 308.

Note that the program executed by the computer may be a program that performs processing in a time series according to an order described in this specification, or may be a program that performs processing in parallel or at necessary timing such as when a call is made.

Note that, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

Furthermore, the effects described in this specification are merely examples and are not limited, and other effects may also be present.

The embodiment of the present technology is not limited to the above-described embodiments, and various modifications can be made without departing from the scope of the present technology.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

<Combination Example of Configuration>

The present technology can also have the following configurations.

(1)

A communication device including:

a wireless resource determination unit configured to determine a first wireless resource including a frequency for transmission of a same frame that is a frame of same data, a code of the same frame, and a time for transmission of the same frame, on the basis of pattern information indicating a unique relationship between a frame number of the same frame and at least one of the frequency or the code; and a transmission unit configured to repeatedly transmit the same frame by using the first wireless resource.

(2)

The communication device according to (1) described above, in which the wireless resource determination unit determines the first wireless resource on the basis of the pattern information indicating a unique relationship between the frame number and the code.

(3)

The communication device according to (1) described above, in which the wireless resource determination unit determines the first wireless resource on the basis of the pattern information indicating a unique relationship between the frame number and the frequency.

(4)

The communication device according to (1) described above, in which the wireless resource determination unit determines the first wireless resource on the basis of the pattern information indicating a unique relationship between the frame number and a combination of the frequency and the code.

(5)

The communication device according to any one of (1) to (4), in which the wireless resource determination unit determines a second wireless resource required for reception of the same frame, on the basis of the first wireless resource.

(6)

The communication device according to (5) described above, further including:

a reception unit configured to repeatedly receive the same frame by using the second wireless resource.

(7)

A communication method including, by the communication device:

determining a first wireless resource including a frequency for transmission of a same frame that is a frame of same data, a code of the same frame, and a time for transmission of the same frame, on the basis of pattern information indicating a unique relationship between a frame number of the same frame and at least one of the frequency or the code; and repeatedly transmitting the same frame by using the first wireless resource.

(8)

A communication device including:

a frame detection unit configured to detect a data frame being transmitted with use of a wireless resource including a frequency for transmission of the data frame, a code of the data frame, and a time for transmission of the data frame;

a frame specification unit configured to specify, from the detected data frame on the basis of pattern information, a same frame being transmitted with use of a first wireless resource determined on the basis of the pattern information indicating a unique relationship between a frame number of the same frame that is a frame of same data and at least one of the frequency or the code; and a demodulation unit configured to synthesize and demodulate the same frame.

(9)

The communication device according to (8) described above, in which the same frame is being transmitted with use of the first wireless resource determined on the basis of the pattern information indicating a unique relationship between the frame number and the code.

(10)

The communication device according to (8) described above, in which the same frame is being transmitted with use of the first wireless resource determined on the basis of the pattern information indicating a unique relationship between the frame number and the frequency.

(11)

The communication device according to (8) described above, in which the same frame is being transmitted with use of the first wireless resource determined on the basis of the pattern information indicating a unique relationship between the frame number and a combination of the frequency and the code.

(12)

The communication device according to any one of (8) to (11), further including:

a wireless resource determination unit configured to determine a second wireless resource to be used for transmission of the same frame, on the basis of the first wireless resource.

(13)

The communication device according to (12) described above, further including:

a transmission unit configured to repeatedly transmit the same frame by using the second wireless resource.

(14)

A communication method including, by the communication device:

detecting a data frame being transmitted with use of a wireless resource including a frequency for transmission of the data frame, a code of the data frame, and a time for transmission of the data frame;

specifying, from the detected data frame on the basis of pattern information, a same frame being transmitted with use of a first wireless resource determined on the basis of the pattern information indicating a unique relationship between a frame number of the same frame that is a frame of same data and at least one of the frequency or the code; and synthesizing and demodulating the same frame.

REFERENCE SIGNS LIST

101 Wireless communication system
111-1 to 111-3, 111 User terminal
112 Communication device
121 Wireless communication unit
122 Wireless control unit
123 Frame generation unit
124 Sensor
125 Wireless resource determination unit
126 Storage unit
127 Frame detection unit
128 Frame demodulation unit
141 Wireless communication unit
142 Wireless control unit
143 Frame generation unit
144 Wireless resource determination unit
145 Storage unit
146 Frame detection unit
147 Same frame specification unit
148 Frame demodulation unit

The invention claimed is:

1. A communication device, comprising:
a central processing unit (CPU) configured to:
determine a first wireless resource including a frequency for transmission of a first frame of data, a code of the first frame, and a time for the transmission of the first frame, based on pattern information indicating a first unique relationship between a frame number of the first frame and at least one of the frequency of the first frame or the code of the first frame;
repeatedly transmit frames of the data by use of the first wireless resource, wherein the frames include the first frame and a second frame; and
determine the first wireless resource based on the pattern information indicating a second unique relationship between a frame number of the second frame of the data and a frequency of the second frame.

2. The communication device according to claim 1, wherein
the frames further include a third frame, and
the CPU is further configured to determine the first wireless resource based on the pattern information indicating a third unique relationship between a frame number of the third frame of the data and a code of the third frame.

3. The communication device according to claim 1, wherein
the frames further include a third frame, and
the CPU is further configured to determine the first wireless resource based on the pattern information indicating a third unique relationship between a frame number of the third frame of the data and a combination of a frequency of the third frame and a code of the third frame.

4. The communication device according to claim 1, wherein the CPU is further configured to determine a second wireless resource required for reception of the first frame, based on the first wireless resource.

5. The communication device according to claim 4, wherein the CPU is further configured to repeatedly receive the frames by use of the second wireless resource.

6. A communication method, comprising:
in a communication device:
determining a first wireless resource including a frequency for transmission of a first frame of data, a code of the first frame, and a time for the transmission of the first frame, based on pattern information indicating a first unique relationship between a frame number of the first frame and at least one of the frequency of the first frame or the code of the first frame;
repeatedly transmitting frames of the data by using the first wireless resource, wherein the frames include the first frame and a second frame; and
determining the first wireless resource based on the pattern information indicating a second unique relationship between a frame number of the second frame of the data and a frequency of the second frame.

7. A communication device, comprising:
a central processing unit (CPU) configured to:
detect a data frame that is transmitted with use of a wireless resource including a frequency for transmission of the data frame, a code of the data frame, and a time for the transmission of the data frame;
specify, from the detected data frame based on pattern information, a first frame that is transmitted with use of a first wireless resource determined based on the pattern information indicating a first unique relationship between a frame number of the first frame of data and at least one of the frequency or the code;
synthesize and demodulate the first frame; and
specify, from the detected data frame based on the pattern information, a second frame that is transmitted with use of the first wireless resource determined based on the pattern information indicating a second unique relationship between a frame number of the second frame and the frequency.

8. The communication device according to claim 7, wherein the CPU is further configured to specify, from the detected data frame based on the pattern information, a third frame that is transmitted with use of the first wireless resource determined based on the pattern information indicating a third unique relationship between a frame number of the third frame and a code of the third frame.

9. The communication device according to claim 7, wherein the first frame is transmitted with use of the first wireless resource determined based on the pattern information indicating a third unique relationship between the frame number of the first frame and a combination of the frequency and the code.

10. The communication device according to claim 7, wherein the CPU is further configured to determine a second wireless resource to be used for transmission of the first frame, based on the first wireless resource.

11. The communication device according to claim 10, wherein
the CPU is further configured to repeatedly transmit frames of the data by use of the second wireless resource, and
the frames include the first frame and the second frame.

12. A communication method, comprising:
in a communication device:
detecting a data frame that is transmitted with use of a wireless resource including a frequency for transmission of the data frame, a code of the data frame, and a time for the transmission of the data frame;
specifying, from the detected data frame based on pattern information, a first frame that is transmitted with use of a first wireless resource determined based on the pattern information indicating a first unique relationship between a frame number of the first frame of data and at least one of the frequency or the code;
synthesizing and demodulating the first frame; and
specifying, from the detected data frame based on the pattern information, a second frame that is transmitted with use of the first wireless resource determined based on the pattern information indicating a second unique relationship between a frame number of the second frame and the frequency.

* * * * *